United States Patent
Abraham et al.

[11] Patent Number: 6,004,030
[45] Date of Patent: Dec. 21, 1999

[54] CALIBRATION APPARATUS AND METHODS FOR A THERMAL PROXIMITY SENSOR

[75] Inventors: David William Abraham, Ossining, N.Y.; Erhard Theodor Schreck, San Jose, Calif.

[73] Assignee: International Business Machines Corporation, Armonk, N.Y.

[21] Appl. No.: 09/152,989

[22] Filed: Sep. 14, 1998

Related U.S. Application Data

[62] Division of application No. 08/755,535, Nov. 21, 1996, Pat. No. 5,806,978.

[51] Int. Cl.$^6$ ............................. G01K 15/00; G01N 25/00
[52] U.S. Cl. ...................... 374/1; 374/6; 374/7; 374/141
[58] Field of Search .................................. 374/1, 5, 6, 7, 374/141

[56] References Cited

U.S. PATENT DOCUMENTS

| | | |
|---|---|---|
| 4,522,510 | 6/1985 | Rosencwaig et al. ........................ 374/7 |
| 4,551,030 | 11/1985 | Luukkala et al. ............................ 374/7 |
| 4,679,946 | 7/1987 | Rosencwaig et al. ........................ 374/7 |
| 4,747,698 | 5/1988 | Wickramasinghe et al. ............... 374/6 |
| 5,073,714 | 12/1991 | Nguyen ..................................... 250/341 |
| 5,406,377 | 4/1995 | Dumoulin ................................. 356/346 |
| 5,527,110 | 6/1996 | Abraham et al. ............................ 374/7 |

*Primary Examiner*—Christopher W. Fulton
*Assistant Examiner*—Quyen Doan
*Attorney, Agent, or Firm*—Heslin & Rothenberg, P.C.

[57] ABSTRACT

Apparatus and methods for calibrating a thermal proximity sensor are disclosed. Thermal responses from a thermal proximity sensor are used to sense the instantaneous distance between the sensor and a medium over which the sensor is moved, in a data storage system. Sensing the instantaneous distance results in detection of topographical variations on the medium. Calibration techniques for the sensor are disclosed herein and involve, in one aspect, using primarily electrical measurements to calibrate the sensor; and in another aspect, varying the distance between the sensor and the medium, obtaining actual thermal responses from the sensor, and using the actual responses (via direct comparison or curve fitting) to calibrate the sensor. In one embodiment, the sensor is a magnetoresistive access element used to access data on the medium.

34 Claims, 16 Drawing Sheets

MR HEAD NONLINEARITY

MR HEAD NONLINEARITY

CALIBRATION APPARATUS AND METHODS FOR A THERMAL PROXIMITY SENSOR

CROSS-REFERENCE TO RELATED APPLICATION

This application is a divisional of U.S. patent application Ser. No. 08/755,535, filed Nov. 21, 1996, entitled "CALIBRATION APPARATUS AND METHODS FOR A THERMAL PROXIMITY SENSOR," now U.S. Pat. No. 5,806,978 issued Sep. 15, 1998.

RELATED APPLICATION INFORMATION

This application is related to commonly assigned:
U.S. Pat. No. 5,527,110 entitled "Method and Apparatus for Detecting Asperities On Magnetic Disks Using Thermal Proximity Imaging," issued Jun. 18, 1996; and
U.S. patent application Ser. No. 08/643,193, entitled "Method and Apparatus for Automatic Classification of Medium Conditions," Attorney Docket No. YO9-96-002, filed May 6, 1996.
This United States Patent, and the United States Application are hereby incorporated by reference herein in their entirety.

TECHNICAL FIELD

This invention relates generally to apparatus and methods for the detection of topographical variations on a surface of a data storage medium using the thermal response of a sensor moving relative thereto. More particularly, the invention relates to apparatus and methods for calibrating the sensor used to detect the variations in order to more accurately predict its response to the variations.

BACKGROUND OF THE INVENTION

Thermal proximity imaging or sensing is a technique by which topographical variations (e.g., asperities, projections, recesses, etc.) on a surface of a medium can be detected and characterized by monitoring the thermal response of a sensor in motion relative to the surface. As disclosed in the above-identified U.S. Pat. No. 5,527,110, a sensor, possibly a magnetoresistive access element used to access data on a data storage medium, is heated using a known bias current. The Joule effect heat induced in the sensor by the bias current varies when topographical variations on the surface pass by the sensor during the relative movement between the sensor and the surface. Because the topographical variations vary the distance ("height" or "gap") between the sensor and the surface, and because the heat transferred from the sensor varies as a function of this distance, measuring or monitoring the temperature change of the sensor is a useful technique for identifying the location and character of the topographical variations on the medium.

Thermal proximity sensing ("TPS") is a very sensitive and reliable indicator of disk surface topography. It can serve as an imaging tool, defect detector and a sensitive indicator of head dynamics. Thermal proximity sensing has been shown to be a useful tool for "in situ" measurement of disk topography and for defect detection. It is a non-invasive technique using the variation of temperature of the sensor element with gap spacing. Sensitivity is in the sub-nanometer range for height, and thermal response is in the MHz range for current head geometries and bias current arrangements. However, thermal proximity sensing is not an intrinsically self-calibrating method and, therefore, for certain demanding applications, a technique for providing calibrated, quantitative height information is an important requirement.

For qualitative applications such as visually inspecting the medium surface for topographical features, reliance on an uncalibrated TPS image is often sufficient. However, for more demanding applications such as thermal glide screening for large defects, calibration of the thermal response to the distance between the sensor and the surface is important. Unlike magnetic measurements of head-disk spacing in which the signal amplitude varies exponentially with height and recorded wavelength (in accordance with the Wallace Spacing Law), TPS responses are head-dependent and require calibration. It has been observed that thermal responses can vary by a factor of two or more for a sampling of nominally identical suspension-mounted heads. Thus, calibration is required to make estimates of height with greater accuracy than this factor of two.

Therefore, to provide quantitatively accurate images of topographical variations on a surface over which a TPS sensor is to be moved, techniques for calibrating the sensor are required. The calibration techniques should support sensors designed for non-invasive, in-situ measurement of topography in storage systems, and should therefore, preferably, not require any particular, non-standard use or manipulation of the surface itself.

SUMMARY OF THE INVENTION

The required thermal proximity sensor calibration techniques are provided by the instant invention, which in one aspect, is a calibration technique (method and system) wherein primarily electrical measurements are used to determine a thermal sensitivity of a sensor to a distance between the sensor and a surface relative to which the sensor is to be moved. The technique may include applying a first electrical stimulus (e.g., V or I) to the sensor such that a first electrical response (e.g., V or I or R) results therefrom, measuring the first electrical response, and determining a thermal calibration value as a function of the first electrical stimulus and the first electrical response. The thermal calibration value is substantially determinative of the thermal sensitivity of the sensor to the distance between the sensor and the surface.

The first electrical stimulus and the first electrical response comprise a point alone a curve defined by the relationship:

$$V = C_1 I + C_3 I^3$$

where
V comprises a voltage across the sensor,
I comprises a current through the sensor,
$C_1$ comprises a linear coefficient relating V and I, and
$C_3$ comprises the thermal calibration value.
Additional points along this curve comprising electrical stimuli and respective responses can be measured to obtain the thermal calibration value $C_3$.

The sensor may be an access element and the surface may be a storage medium to be accessed by the access element. Upon the application of a bias current to the access element, the thermal sensitivity of the access element to the distance between the element and the storage medium is defined by a sensitivity value "S" proportional to the calibration value multiplied by the cube of the bias current.

In another aspect, the present invention is a calibration technique wherein an instantaneous distance "d" is varied between the sensor and the surface. A plurality of actual thermal responses of the sensor at a plurality of actual times during the varying are measured, and the thermal sensitivity of the sensor to the instantaneous distance d is determined using the plurality of actual thermal responses.

In one embodiment, movement of the sensor is induced, and the movement of the sensor can be monitored, thereby producing a monitored movement function. In this case, a comparison is made between the plurality of actual thermal responses and the monitored movement function to determine the sensitivity of the sensor to the instantaneous distance d between the sensor and the surface.

In a modified embodiment, the sensor is sinusoidally moved an excursion distance $d_1$ about a mean distance $d_o$ according to the movement function:

$$d = d_o + d_1 \sin(\omega t)$$

where $\omega$ comprises a frequency of movement, and t comprises time.

In this case, a calibration value $C_0$ is determined substantially according to the relationship:

$$atr(t) = \frac{C_0}{d_o + d_1 \sin(\omega t)}$$

where atr(t) comprises an actual thermal response (e.g., a voltage VTPS across the sensor) at time t.

In an exemplary calculation technique to obtain $C_0$ and therefore a sensitivity value S, an intercept point "b" of a curve linearly fitted to a plurality of data points, each comprising a first value and a second value, may be determined, the first value being related to the reciprocal of one actual thermal response of the plurality of actual thermal responses, and the second value being related to sin ($\omega t'$) at the respective time t' of the plurality of respective times. The sensitivity of the sensor relates to the instantaneous distance d according to a sensitivity value "S", which is derived as:

$$S = \frac{\partial V_{TPS}}{\partial d} \simeq \frac{C_0}{d_o^2} = \frac{1}{bd_o}$$

(V/nm to first order)

In another embodiment, the instantaneous distance d between the sensor and the surface is varied by placing the sensor in motion relative to the surface, wherein the surface has topographical variations of a predetermined nature thereon. The sensitivity of the sensor is determined using the actual thermal responses.

The calibration techniques disclosed herein are particularly suited for thermal proximity sensors to be used for in-situ or non-invasive measurement of topographical variations on surfaces of media in data storage systems.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

DETAILED DESCRIPTION OF THE PREFERRED EMBODIMENT(S)

Figure 1:
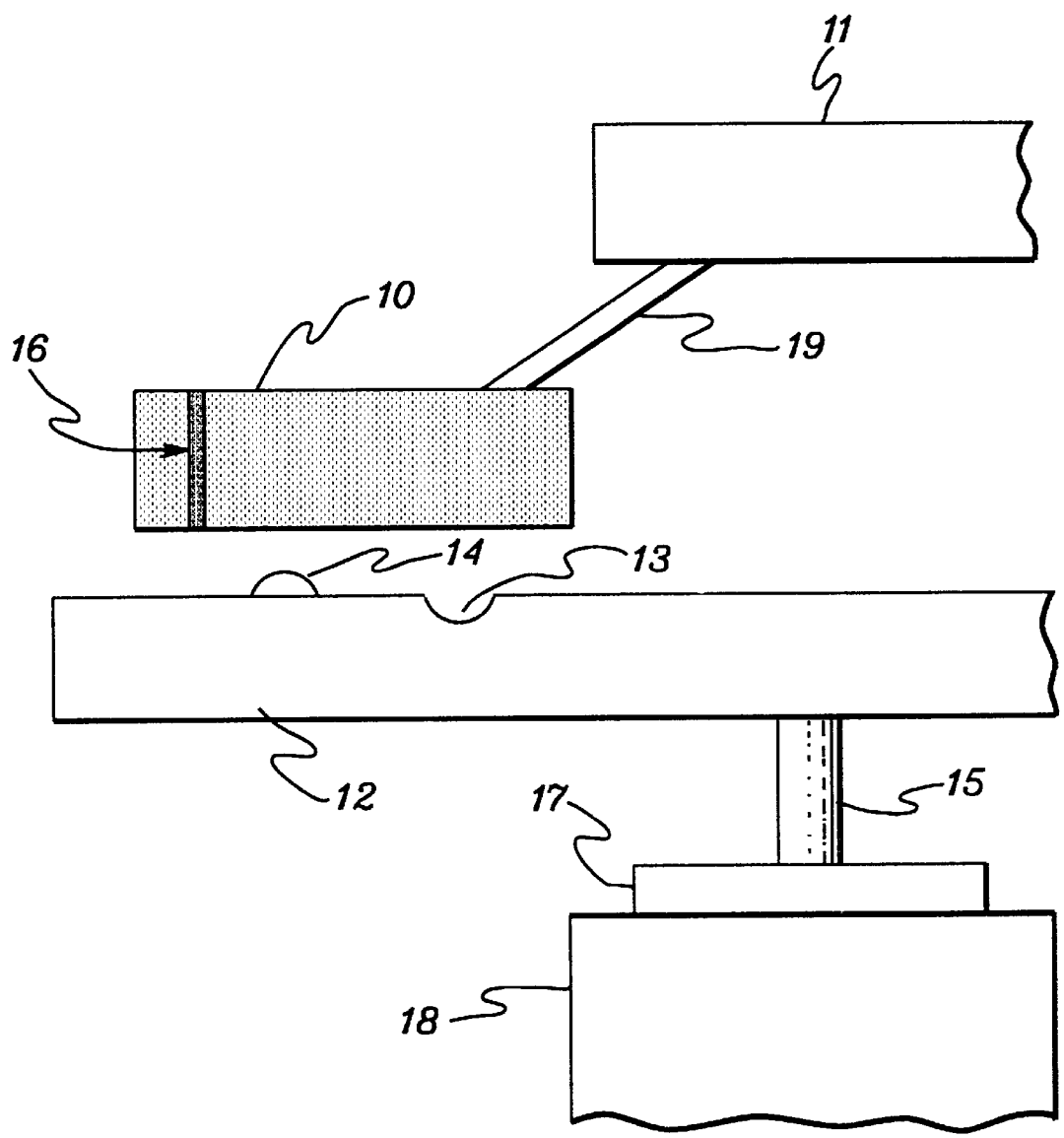
FIG. 1 depicts an exemplary data storage system including a thermal proximity sensing head and a data storage medium having topographical variations thereon.

This Description is arranged into the following subject matter areas:

1.0 Thermal Proximity Sensing—Introduction
2.0 Calibration by Electrical Measurements
   2.1 Relationship Between TPS Signal and Height
   2.2 Extracting $C_3$ From Points Along Sensor I-V Curve
   2.3 Test Results
3.0 Calibration by Induced Gap Variance
   3.1 Extraction of Sensitivity S from Head Movement
   3.2 Test Results
1.0 Thermal Proximity Sensing—Introduction As an introduction to a typical TPS system, reference is made to the data storage system of FIG. 1, wherein a head is shown including sensor or access element 16 on a slider 10 suspended in relation to an actuator 11 (via suspension 19). The head is used to sense exemplary topographical variations 13, 14 on a surface of a storage medium 12 (e.g., a disk). Disk 12 rotates on a spindle 15, driven by a motor 18. (Any type of relative motion between the access element or sensor and the medium is referred to herein as the medium moving relative to the sensor or the sensor moving relative to the medium. This naturally includes a moving medium and fixed sensors, spinning disks, moving tapes, or can be a moving sensor and fixed medium, or any combination thereof.) An encoder 17 provides data on the relative rotational orientation of disk 12 with respect to slider 10.

Slider 10 has an air bearing surface facing disk 12. The relative motion of the air bearing surface of slider 10 and the planar surface of disk 12 maintains a distance between the slider 10 and disk 12 substantially constant. The air bearing surface of slider 10 is designed to provide a constant fly height (for a given rotational disk speed) of slider 10 above the surface of disk 12.

As discussed above, for thermal proximity sensing, the temperature of a sensor, in one embodiment the exemplary magnetoresistive access element 16, is elevated using Joule heating. As the sensor moves relative to the disk, its instantaneous temperature changes as a function of the instantaneous distance changes between the sensor and the disk. If a protrusion on the surface causes the gap spacing to temporarily vary, or decrease, the temperature will cool and can be sensed as a momentary spike in the monitored thermal response of the sensor signal due to its non-zero temperature co-efficient of resistance. The amplitude of the spike is proportional to the temperature differential maintained in the magnetoresistive element versus the disk surface, and to the thermal properties of the protrusion, and depends on the instantaneous sensor-disk spacing (as opposed to the roughly average fly height).

Figure 2:
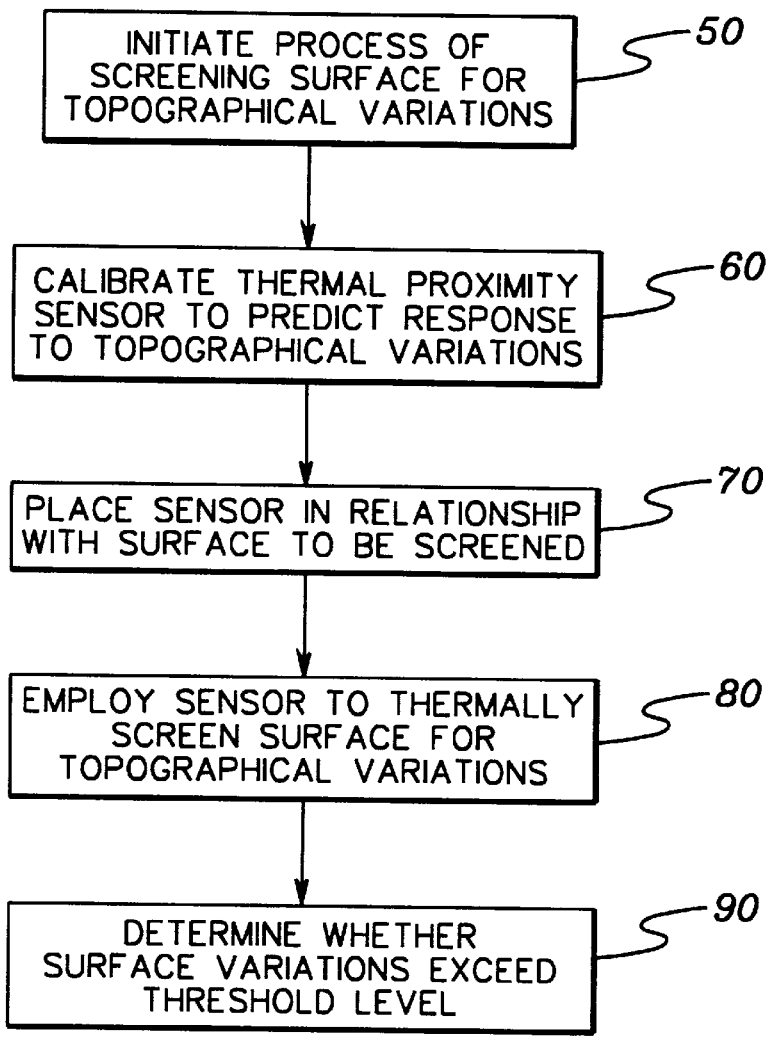
FIG. 2 is an exemplary summarization of the steps necessary to screen a surface for topographical variations using thermal proximity sensing.

With reference to FIG. 2, represented therein is an exemplary summarization of the steps necessary to effectively screen a surface for topographical variations using the system discussed above. Initiation of the screening process is via STEP 50. STEP 60, "Calibrate Thermal Proximity Sensor to Predict Response to Topographical Variations," is the subject of the discussions below related to electrical calibration (Section 2) and induced gap variance calibration (Section 3). As discussed further below, this step may take place while the sensor is not in operative relationship with the surface to be screened. Following, calibration, the sensor is placed in relationship with the surface in STEP 70. The surface is thereafter screened in STEP 80 and a determination is made in STEP 90 regarding whether the variations exceed acceptable levels.

2.0 Calibration by Electrical Measurements

Proposed herein are techniques wherein calibration of the TPS sensor (FIG. 2, STEP 60) is achieved by simple electrical measurements. The instant inventors have discovered, and verified through rigorous testing, that the thermal sensitivity of the sensor to the distance between the sensor and a surface over which the sensor is to be moved can be predicted based solely upon electrical measurements of the sensor. These measurements can be made without special preparation of the disk or sensor or even in the absence of the disk. They can be made prior to assembly of the sensor into a data storage system, or, given adequate capability in the system electronics, the measurements could be made in the assembled system. This electrical calibration technique removes the bulk of the variability in the processed thermal response of the sensor, and any remaining uncertainty in calibration is due to variation in fly height and in heat transport properties from sensor to disk.

A preferred implementation of this calibration technique consists of the following phases.

First, and as discussed below in greater detail in Sections 2.2 and 2.3, a calibration value $C_3$ is determined for the sensor using primarily electrical measurements. For current IBM products, e.g., Ultra-Star, each head may be electrically calibrated at the wafer level, i.e., during the fabrication thereof, and before the head is placed into the data storage system. The resistance of the head is measured at two different bias currents, typically 1 mA and 10 mA. These two resistances plus the bias current values may be stored in a mainframe database record. As discussed in greater detail in Section 2.2 below, these pairs of current/resistance values comprise points on the I-V curve of the head:

$$V = C_1 I + C_3 I^3$$

and $C_3$ may be determined according to the following relationship:

$$C_3 = \frac{R_2 - R_1}{(I_2^2 - I_1^2)}$$

where $R_1$ and $R_2$ are the resistances measured at bias currents $I_1$ and $I_2$ mA, respectively. The sensitivity of the sensor to the height of the topographical variations is related to the operating bias current and the calibration value $C_3$ according to the following relationship:

$$S(\text{mv/nm}) \, C_3 I_{op}^3$$

where:

$I_{op}$ is the operating bias current.

Second, practical limitations of the storage system electronics must be compensated for, to allow a true measure of the thermal response of the sensor. For Ultra-Star, the primary consideration is the high-pass filter present in the armature electronics ("AE") module. This filter is (for the frequencies of interest for thermal measurements) a high-pass single pole at a frequency of order 0.5 MHz. A suitable electronics module that includes a filter with a frequency response that compensates for the AE rolloff should be incorporated. (See, for example, U.S. patent application Ser. No., 08/581,906, filed Jan. 2, 1996, now pending, Attorney Docket Number RO995-081, entitled "Method and Apparatus for Restoring a Thermal Response Signal of a Magnetoresistive Head"). In the case of Ultra-Star, the 3 dB point of this rolloff is quite variable, specified less precisely than a factor of two in frequency. However, since most of this variation is due to MR sensor resistance, a calibrated thermal signal can be obtained by using tabulated values of this resistance. As an alternative to estimating the corner frequency of the AE module, a realtime measurement of AE characteristics could be made for each head. (Additional detailed rolloff frequency measurements are discussed below in connection with FIGS. 9a–b.)

Third, a technique for identifying and classifying defects using the TPS sensor is required, following its calibration. For this technique, the above-incorporated U.S. Pat. No. 5,527,110 entitled "Method and Apparatus for Detecting Asperities On Magnetic Disks Using Thermal Proximity Imaging," and U.S. patent application Ser. No. 08/643,193, entitled "Method and Apparatus for Automatic Classification of Medium Conditions," may be consulted. (i.e., STEPS 80, 90 in FIG. 2 herein).

The following sections discuss in detail the relationship between the TPS signal and sensor height over the surface (Section 2.1); the measurement of point pairs along the I-V sensor curve (Section 2.2); and test results (Section 2.3) verifying that the electrical determination of the calibration value $C_3$, upon which the sensitivity S of the sensor is based, indeed provides an accurate thermal calibration for the sensor.

2.1 Relationship Between TPS Signal and Height

Figure 3:
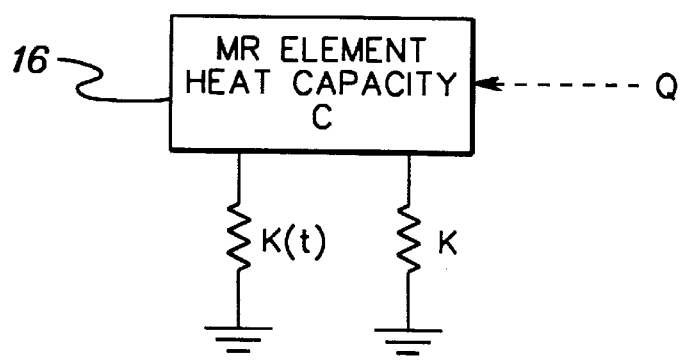
FIG. 3 is a model of a thermal proximity sensor having power input thereto, a given heat capacity, and a thermal conductance to ground.

To establish some understanding of the thermal processes which occur in the sensor, a simple model of the sensor is depicted in FIG. 3, consisting of a single lumped mass corresponding to the sensor 16 and perhaps some of the surrounding material, and a thermal conductance K to ground. A mathematical solution for temperature of the head as the power input to the head, Q, is varied sinusoidally at some frequency ω has been reviewed. For this model, the thermal system acts as a low-pass single pole thermal filter, and the head response to an oscillating heat source has a finite response time. The effect of the proximity of the head to the disk becomes clear if a small thermal conductance is introduced which is time dependent as well. In this case, Q is constant and K includes a time-dependent term.

The head voltage is given by:

$$V = I \cdot R(T)$$

where R is assumed to be a function of temperature T. A first order Taylor Series is established:

$$V = I\left(R_o(T) + \frac{\partial R}{\partial T}\Delta T\right)$$

Temperature changes in the head according to the relationship:

$$\Delta T = \frac{\dot{Q}}{K(\omega)}$$

Since the Joule heat in the head is induced according to the current applied:

$$\dot{Q} = I^2 R$$

the head voltage is given by:

$$V = IR_o + \frac{R}{K(\omega)}\frac{\partial R}{\partial T}I^3$$

By defining the relationship:

$$C_3 = \frac{R}{K(\omega)}\frac{\partial R}{\partial T}$$

the I-V curve of the sensor is represented by:

$$V = IR_o + C_3 I^3$$

Though $C_3$ may be difficult to measure directly because of its dependence on these thermal properties R, K and T, it can nevertheless be determined electrically based on the head I-V equation:

$$V = IR_o + C_3 I^3$$

Therefore, by making simple electrical measurements, the calibration value $C_3$ can be determined.

It is necessary to next establish the relationship between the calibration value $C_3$, the sensitivity S of the sensor, and the height of the topographical variations over which the sensor is to be moved. Using the thermal model of FIG. 3, it is known that:

$$\dot{Q} = C\frac{\partial T}{\partial t} + KT$$

where C is the heat capacity, and K is the thermal conductance. Fourier transforming yields:

$$\dot{Q}(\omega) = C \cdot i\omega T(\omega) + KT(\omega)$$

(i.e., a low-pass filter with a pole at $\omega = K/C$) and rearranging yields:

$$T(\omega) = \frac{\dot{Q}(\omega)}{(i\omega C + K)}$$

The head temperature therefore follows heat input up to $\omega = K/C$. Assuming that the thermal conductivity varies as the head flies over topographical variations:

$$K = K_o + \delta K(t) \quad T = T_o \delta T(t)$$

substituting and transforming yields:

$$\dot{Q} = i\omega C\delta T(\omega) + K_o T_o + \delta K(\omega) T_o$$

Reorganizing:

$$\delta T(\omega) = \frac{(\dot{Q} - K(\omega)T_o)}{(i\omega C + K_o)} = \frac{-\dot{Q}}{i\omega C + K} \cdot \frac{\delta K(\omega)}{K_o}$$

For a smooth variation in height h:

$$\frac{\delta K}{K} \simeq \frac{\delta h}{h}$$

and substituting yields:

$$\delta T(\omega) = \frac{-\dot{Q}}{(i\omega C + K)} \cdot \frac{\delta h}{h}$$

A change in the head voltage signal (discussed above) is given by:

$$\delta V(\omega) = I\frac{\delta R}{\delta T}\delta T(\omega)$$

and since:

$$\dot{Q} = I^2 R$$

the change in TPS voltage is related to change in height according to the following relationships:

$$\delta V(\omega) = -\frac{I^3 \frac{\partial R}{\partial T}}{(i\omega C + K)} \cdot \frac{\partial h}{h}$$

and $$\delta V(\omega) = -I^3 C_3 \frac{\partial h}{h}$$

The thermal sensitivity S is generally referred to herein as:

$$S = \frac{\delta V}{\delta h} \propto C_3 I^3 = \frac{R}{K}\frac{\partial R}{\partial T}I^3$$

Therefore, the sensitivity of the sensor to variations in distance is proportional to $C_3$ multiplied by the cube of the bias current I.

In the case of sensors from different families of storage systems, the thermal conductance K may vary across families, because of different head sizes, suspension geometries, etc., but will likely be constant within each family. In this case, a scalar $A_f$ may be introduced (and measured once for each head family) such that the sensitivity is then:

$S A_f I^3 C_3$

Once $A_f$ is measured for each head family, the sensitivity of all heads within each family can be electrically determined using $C_3$.

2.2 Extracting $C_3$ From Points Along Sensor I-V Curve

If the head voltage is represented as a Taylor Series in current, then $$V = C_1 I + C_3 I^3$$

The square term has been dropped since only an odd dependence in current is expected, and this expectation is verified in Section 2.3 below. ($C_1$ is used for the linear resistance value here for clarity.) Two voltage/current points along this curve can be defined by:

$$V_1 = C_1 I_1 + C_3 I_1^3$$

and $$V_2 = C_1 I_2 + C_3 I_2^3$$

Representing these equations in matrix form yields:

$$\begin{bmatrix} V_1 \\ V_2 \end{bmatrix} = \begin{bmatrix} I_1 & I_1^3 \\ I_2 & I_2^3 \end{bmatrix} \begin{bmatrix} C_1 \\ C_3 \end{bmatrix}$$

Solving this system of equations for $C_3$:

$$\begin{bmatrix} C_1 \\ C_2 \end{bmatrix} = \begin{bmatrix} I_1 & I_1^3 \\ I_2 & I_2^3 \end{bmatrix}^{-1} \begin{bmatrix} V_1 \\ V_2 \end{bmatrix}$$

$$\begin{bmatrix} C_1 \\ C_3 \end{bmatrix} = \begin{bmatrix} I_2^3 & -I_1^3 \\ -I_2 & I_1 \end{bmatrix} \cdot \frac{1}{I_1 I_2^3 - I_2 I_1^3} \cdot \begin{bmatrix} V_1 \\ V_2 \end{bmatrix}$$

$$C_3 = \frac{-V_1 I_2 + V_2 I_1}{I_1 I_2^3 - I_2 I_1^3}$$

Also, using $V = IR$:

$$C_3 = \frac{R_2 - R_1}{(I_2^2 - I_1^2)}$$

$C_3$ can therefore be determined using electrical measurements only by, for example, measuring voltage response pairs to respective current stimuli pairs or by measuring resistance values to respective current stimuli. Subsequent to the discovery of these relationships by the instant inventors, a series of tests was conducted to verify whether in fact $C_3$ accurately predicted the thermal response of the sensor.

2.3 Test Results

Figure 4:
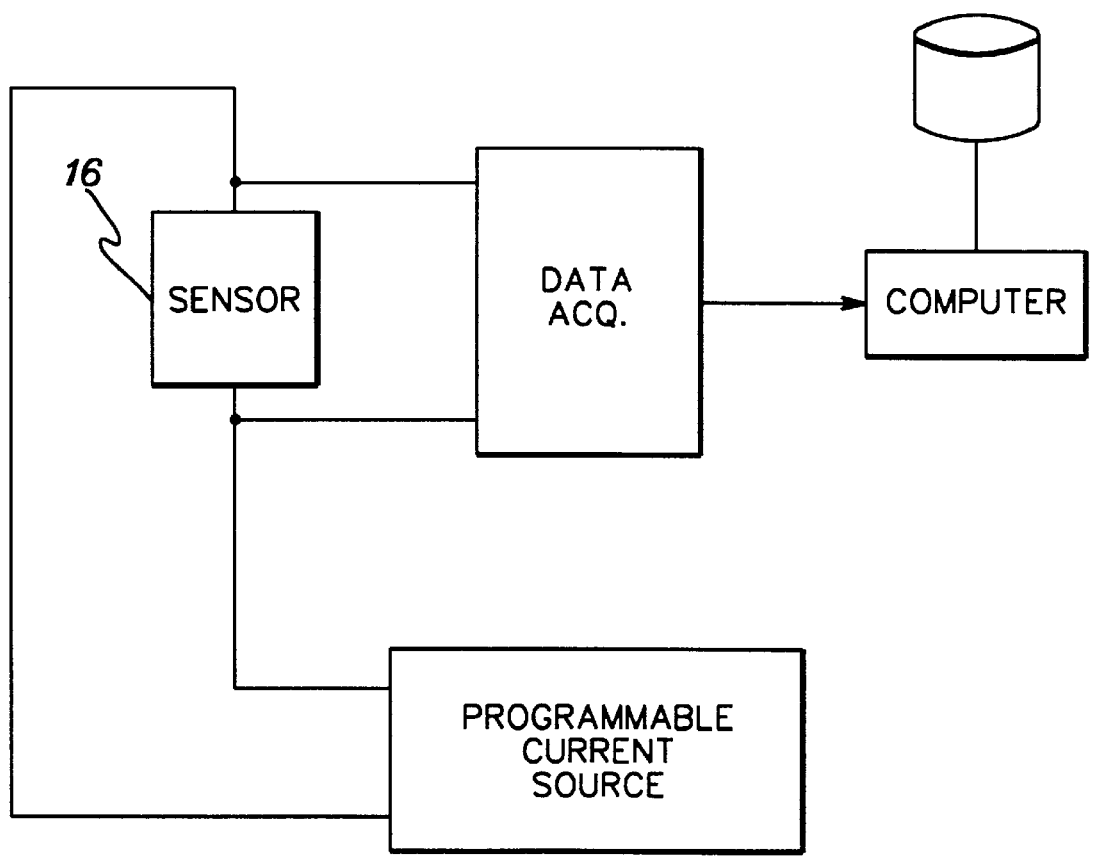
FIG. 4 depicts an exemplary electrical measurement system for electrically calibrating a thermal proximity sensor.

FIG. 4 is an exemplary electrical measurement system for electrically calibrating a sensor, in accordance with the present invention, in which a programmable current source applies current to sensor 16, a data acquisition/processing system reads the thermal response of the sensor (e.g. $V_{TPS}$), and the results may be stored in a computer file. The processing system may perform any of the requisite calculations. It should be noted that all, or any subset of, the system components depicted in FIG. 4 may be located within the completed data storage system itself. Remaining components may be located outside of the system (e.g., in a dedicated calibration system).

The actual thermal responses of a group of 10 Ultra-Star heads to an actual topographical defect were obtained, and the results were compared to the calibration models discussed above. The following measurements were made: Observed peak height (via measured sensor voltage) when scanning a typical topographic defect; and Sensor nonlinear I-V characteristic.

Figure 5:
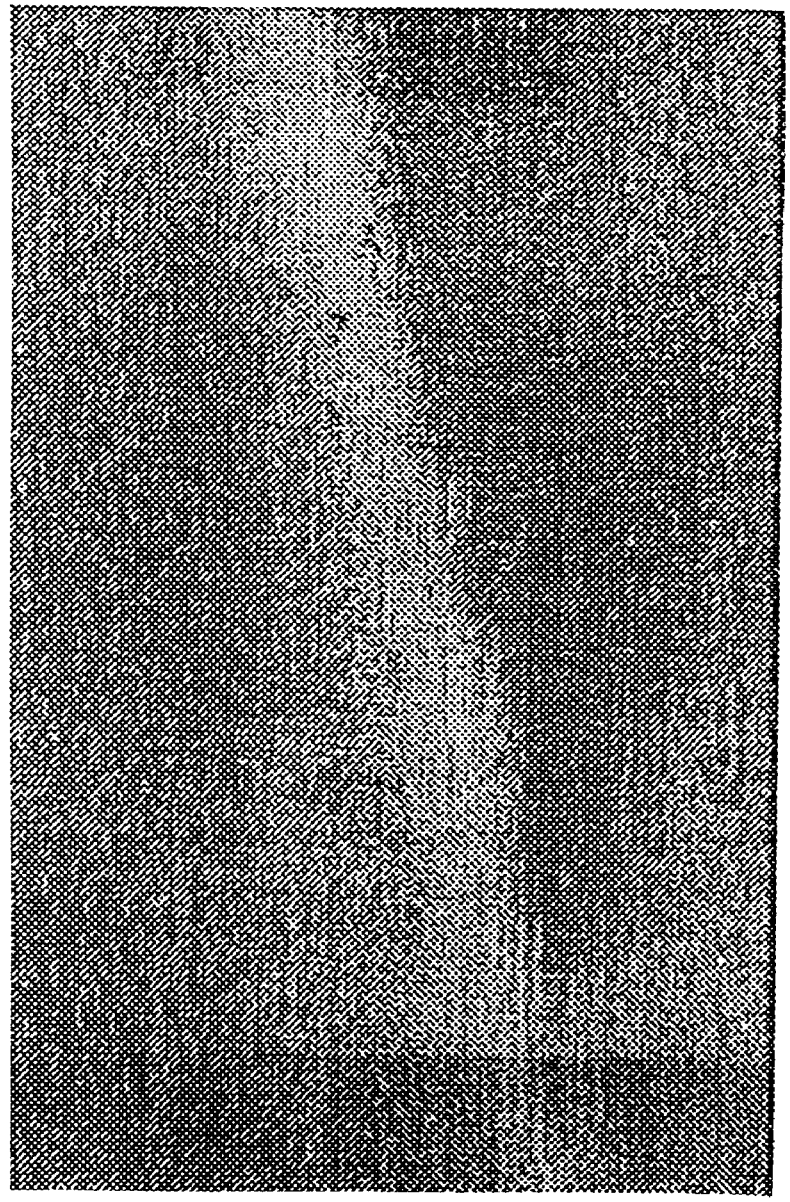
FIG. 5 is a sample defect over which 10 product heads were flown for testing the electrical calibration techniques disclosed herein.
Figure 6:
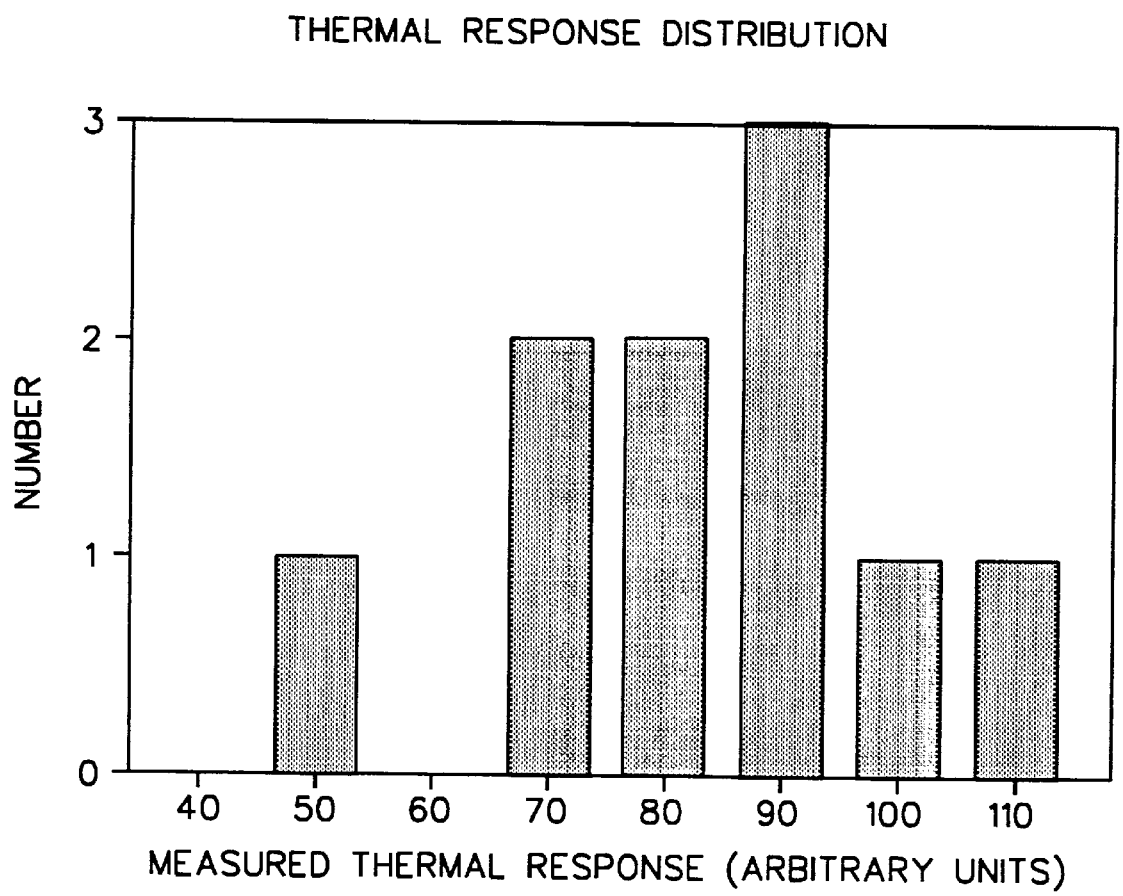
FIG. 6 is a graph of the distributions of the sensitivities of the 10 product heads measured while flown over the sample defect of FIG. 5.

The data obtained are shown in Table 1 below. The heads were all taken from a single batch of Ultra-Star product heads. The resistance of the heads was measured, and the heads were then flown over a sample defect. A TPS image of this defect is shown in FIG. 5, taken with head 1. All heads were biased at 8 mA for these experiments, and data was acquired on a test stand. The response of each of the 10 heads was measured for the same defect. FIG. 6 shows the distribution of measured thermal responses having an average of 80 and standard deviation of 16 or a spread of 20%. (The data for head 8 was discounted since the measured resistance was far out of range, but even inclusion of head 8 doesn't significantly alter the observed spread in thermal sensitivity.)

Note that although the resistance change of order 100 ppm observed when flying over the defect is small, the total resistance change in the head when powering up from 1 mA to 8 mA is much larger, in the range of 3–4%. The magnetoresistive ("MR") element operates hot, and the fractional change in temperature upon bringing the disk into proximity is small.

The variability in thermal sensitivity clearly depends on several factors. Absolute resistance of the MR element does not play a major role in sensitivity as shown by the data in Table 1. The signal strength is, however, expected to be proportional to the amount the resistance changes with temperature. As discussed above, a model of the thermal system predicts that a calibration value $C_3$ is given by:

$$C_3 = \frac{R}{K(\omega)} \frac{\partial R}{\partial T}$$

where R(T) is the temperature dependent MR resistance and K is the thermal conductance of the sensor to the surroundings, and determines in part both TPS sensitivity and the degree of nonlinearity of the current-voltage curve of the MR sensor. Thus, a measure of the isolated head properties provides a reasonable prediction of the TPS sensitivity.

Figure 7A:
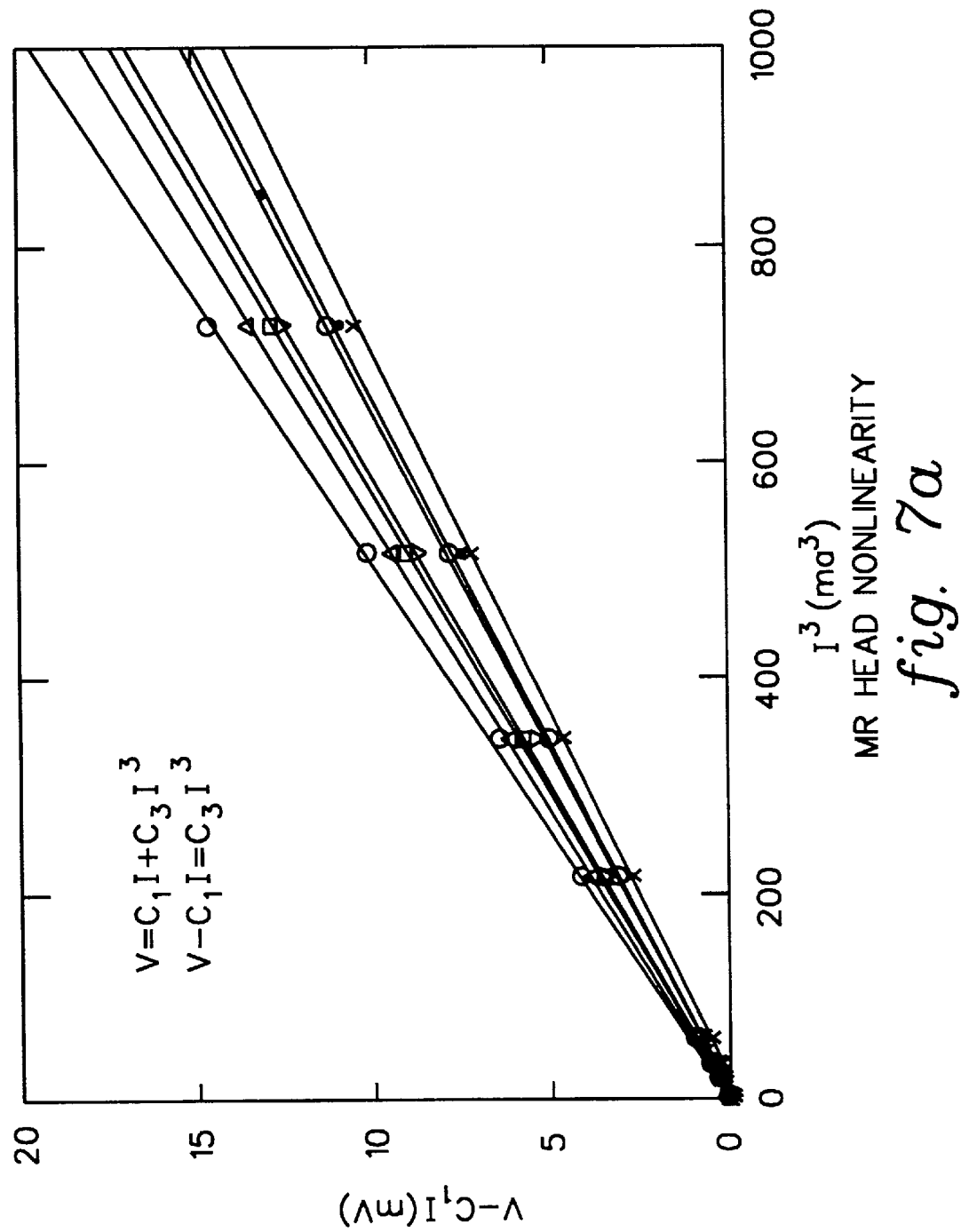
FIG. 7a is a graph of the DC I-V characteristics of the heads fit to the cubic coefficient in current ($C_3$) wherein each line corresponds to a distinct head.
Figure 7B:
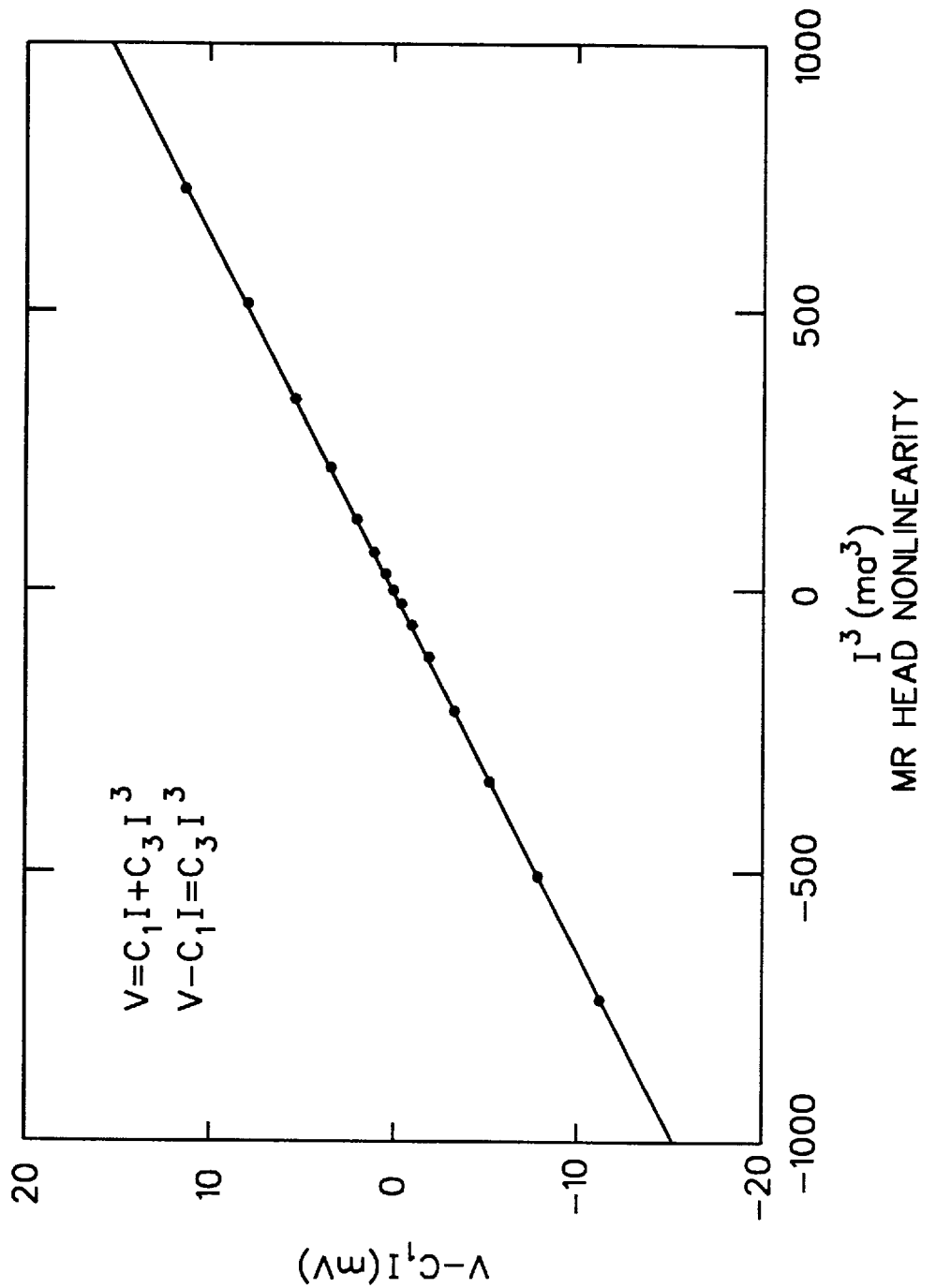
FIG. 7b is a graph of the DC I-V characteristics of a single head over a bipolar range of current I.
Figure 8:
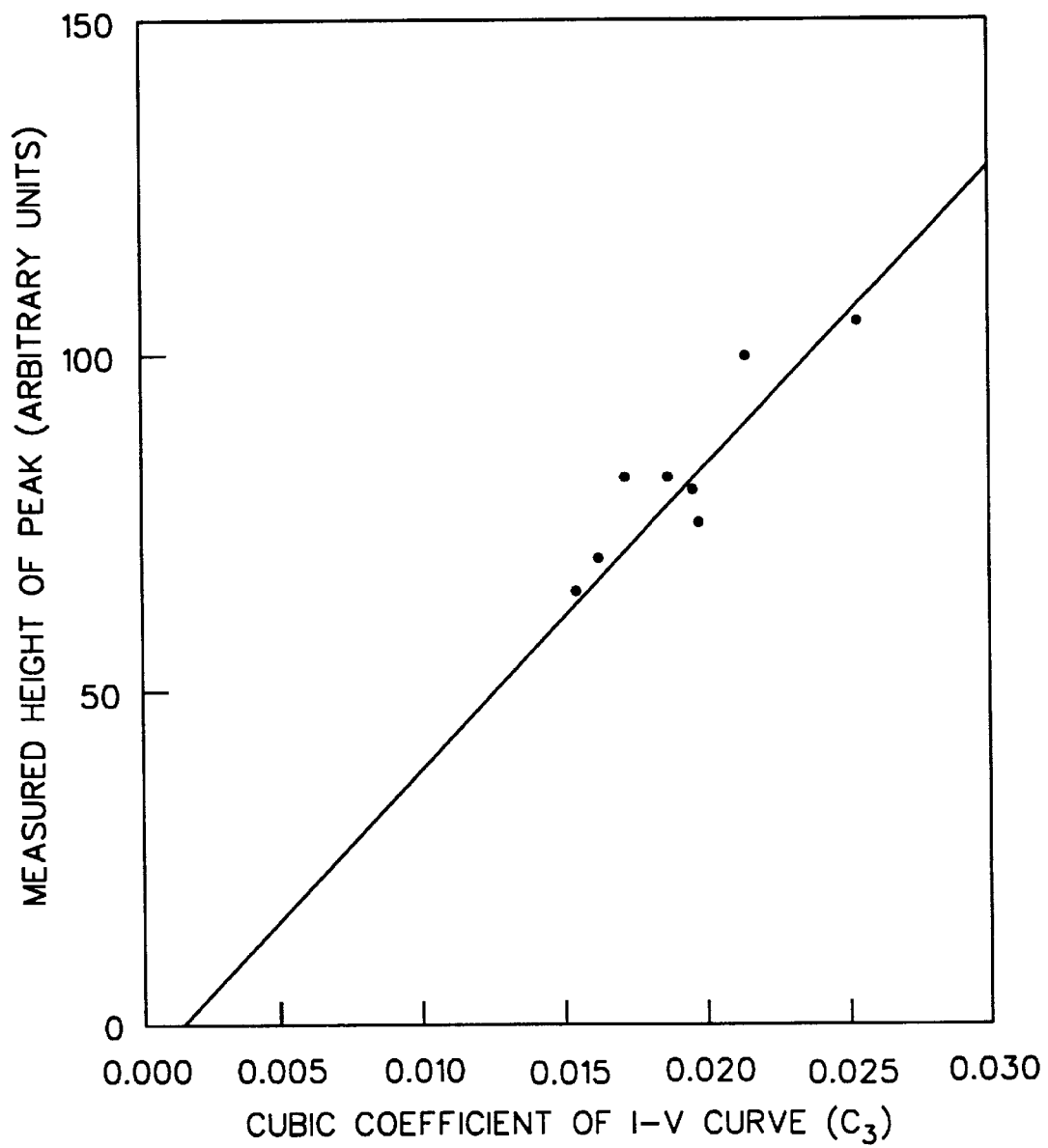
FIG. 8 is a graph of the on-disk measured peak height vs. the electrically measured cubic coefficient $C_3$.

The DC I-V characteristics of the ten heads were then electrically obtained off-disk, with the data shown in Table 1 and in FIG. 7a (multiple heads) and 7b (single head, also checking for polarity variations). The voltage data is fit to a cubic coefficient in current ($C_3$ in Table 1). To emphasize the quality of fit of the data, the nonlinear portion of the head voltage given by $V - I R_o$ is plotted versus $I^3$. In this plot, the slope is given by the cubic coefficient $C_3$. In FIG. 8, the on-disk measured peak height from the disk defect is plotted vs. the electrically measured cubic coefficient $C_3$. The broad spread in data is reduced substantially by this method, and in fact even head 8 (R=54 ohms) falls near the linear fit.

In addition to measurement of the DC thermal sensitivity by I-V curve fits to a cubic model, the AC cubic coefficient was also measured (using techniques like those disclosed in U.S. Pat. No. 5,469,051, entitled Electrical Detector for Circuit Lines, and incorporated herein by reference). In this method, the sensor (in this case an MR sensor) is heated by an AC current containing two frequency components at $\omega$ and $2\omega$. The combination of these two drive currents results in a DC voltage across the sensor, given by the following expression:

$$V_{dc} = \frac{3C_3 I_1^2 I_2}{4}$$

where $I_1$ is the current at $\omega$; and $I_2$ is the current at $2\omega$.

Figure 10:
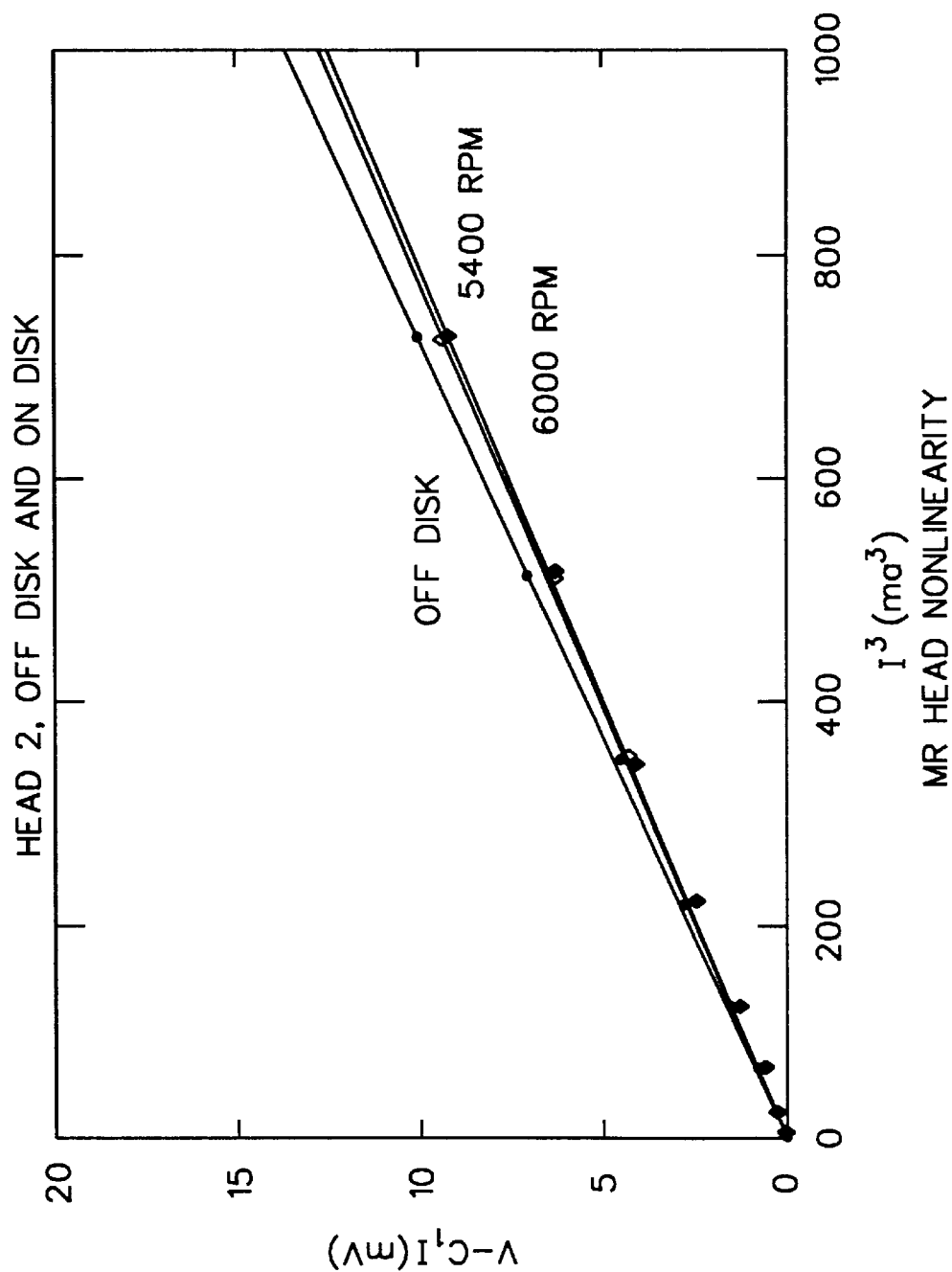
FIG. 10 is a graph comparing the electrical calibrations measured both off-disk and on-disk for a single head.

By measuring DC voltage versus frequency for fixed current amplitudes, the frequency dependent thermal sensitivity of the MR head can be determined. This measurement was performed from 20 Hz to 2 MHz, and the results are Finally, the electrical measurements of $C_3$ were made while flying on the disk to determine if there was any dependence of the measurements on this environment. Shown in FIG. 10 are the DC I-V curves for head number 2, both off the disk and on (at two RPMs). A small change is observed, corresponding to a slight improvement in thermal conduction from the MR element of roughly 3%. However, the intrinsic head properties do not change substantially, and a calibration made via I-V measurements can therefore be used independent of whether the head was flying on the disk or not.

TABLE 1

| | ON DISK | | | OFF DISK | |
|---|---|---|---|---|---|
| HEAD | MEASURED RESISTANCE | MEASURED PEAK | dR/R | CALCULATED RESISTANCE | CALCULATED $C_3$ |
| 1 | 28.40 | 90 | 1.55E-04 | | |
| 2 | 28.14 | 65 | 1.13E-04 | 27.6565 | 0.0153 |
| 3 | 28.61 | 82 | 1.40E-04 | 28.2286 | 0.0170 |
| 4 | 29.73 | 75 | 1.24E-04 | 29.3729 | 0.0196 |
| 5 | 31.89 | 105 | 1.61E-04 | 31.5203 | 0.0253 |
| 6 | 30.66 | 80 | 1.28E-04 | 29.7590 | 0.0194 |
| 7 | 28.94 | 82 | 1.39E-04 | 28.5340 | 0.0185 |
| 8 | 55.06 | 100 | 8.90E-05 | 54.4424 | 0.0213 |
| 9 | 28.14 | 70 | 1.22E-04 | 28.3670 | 0.0161 |
| 10 | 28.44 | 45 | 7.76E-05 | 28.1147 | 0.0173 |
| | | AV: 79.4 | | | |
| | | SD/AV: .20 | | | |

TABLE 2

Figure 9A:
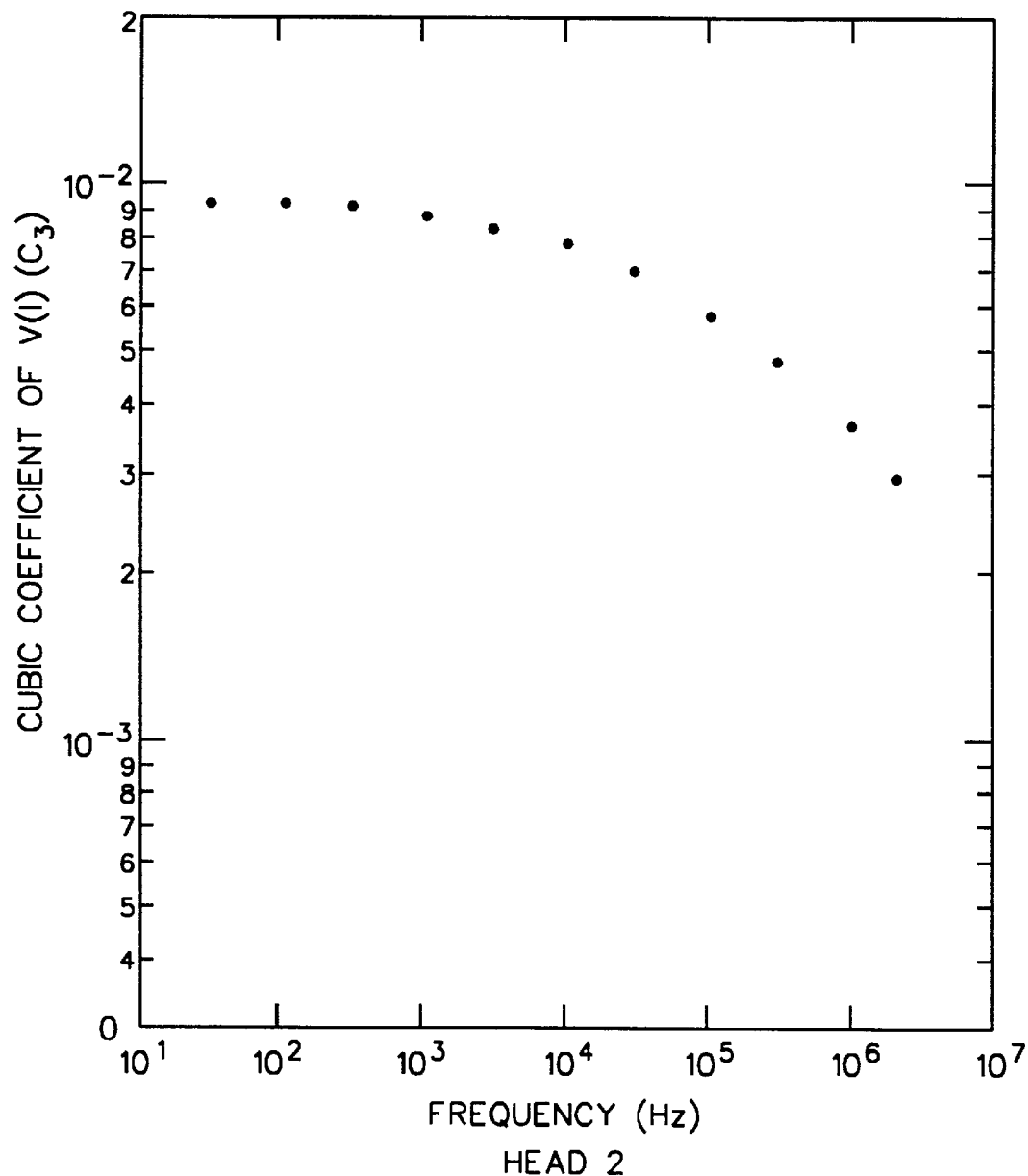
FIGS. 9a–b are graphs depicting the spectral characteristics measured for various product heads.

| Freq(HZ) | V1 (V) | V2 (V) | 2Vdc(90) | 2Vdc(0) | Amp (mv) | Phase | C3 |
|---|---|---|---|---|---|---|---|
| 30.0 | 2.66 | 1.33 | 13 | 1 | 13.0384 | 85.60137 | 0.00917 |
| 100.0 | 2.66 | 1.33 | 13 | 0.5 | 13.00961 | 87.79748 | 0.00915 |
| 300.0 | 2.66 | 1.33 | 13 | 0.5 | 13.00961 | 87.79748 | 0.00915 |
| 1000.0 | 2.66 | 1.33 | 12.3 | 0.1 | 12.30041 | 89.53427 | 0.00865 |
| 3000.0 | 2.66 | 1.33 | 11.7 | 0.5 | 11.71068 | 87.55303 | 0.00824 |
| 10000.0 | 2.66 | 1.33 | 11 | 1.3 | 11.07655 | 83.26001 | 0.00779 |
| 30000.0 | 2.66 | 1.33 | 9.7 | 0.8 | 9.732934 | 85.28532 | 0.00684 |
| 100000.0 | 2.66 | 1.33 | 8 | 1.2 | 8.089499 | 81.4693 | 0.00569 |
| 300000.0 | 2.66 | 1.33 | 6.6 | 1 | 6.675328 | 81.38442 | 0.00469 |
| 1000000.0 | 2.66 | 1.33 | 5 | 1 | 5.09902 | 78.69013 | 0.00359 |
| 2000000.0 | 2.66 | 1.33 | 4 | 1 | 4.123106 | 75.96382 | 0.00290 | presented in Table 2 and in FIG. 9a. Over the relevant range of frequencies (typically 100 kHz to 1 MHz for imaging applications) the sensitivity can be expected to change by roughly one order of magnitude. This effect is important in understanding relative sizes of topographic features, for example. In Table 2, $C_3$ is given by:

$$C_3 = \frac{4Vdc}{(3)(2)(100)V_1^2 V_2}$$

and where:

V1 and V2 are measured biases across a 1 Kohm resistor.

(Vdc(0) and Vdc(90) in Table 2 are differences in amplitudes from 90 to −90 degrees, or 0 to 180 degrees, after a gain stage of 100.)

Figure 9B:
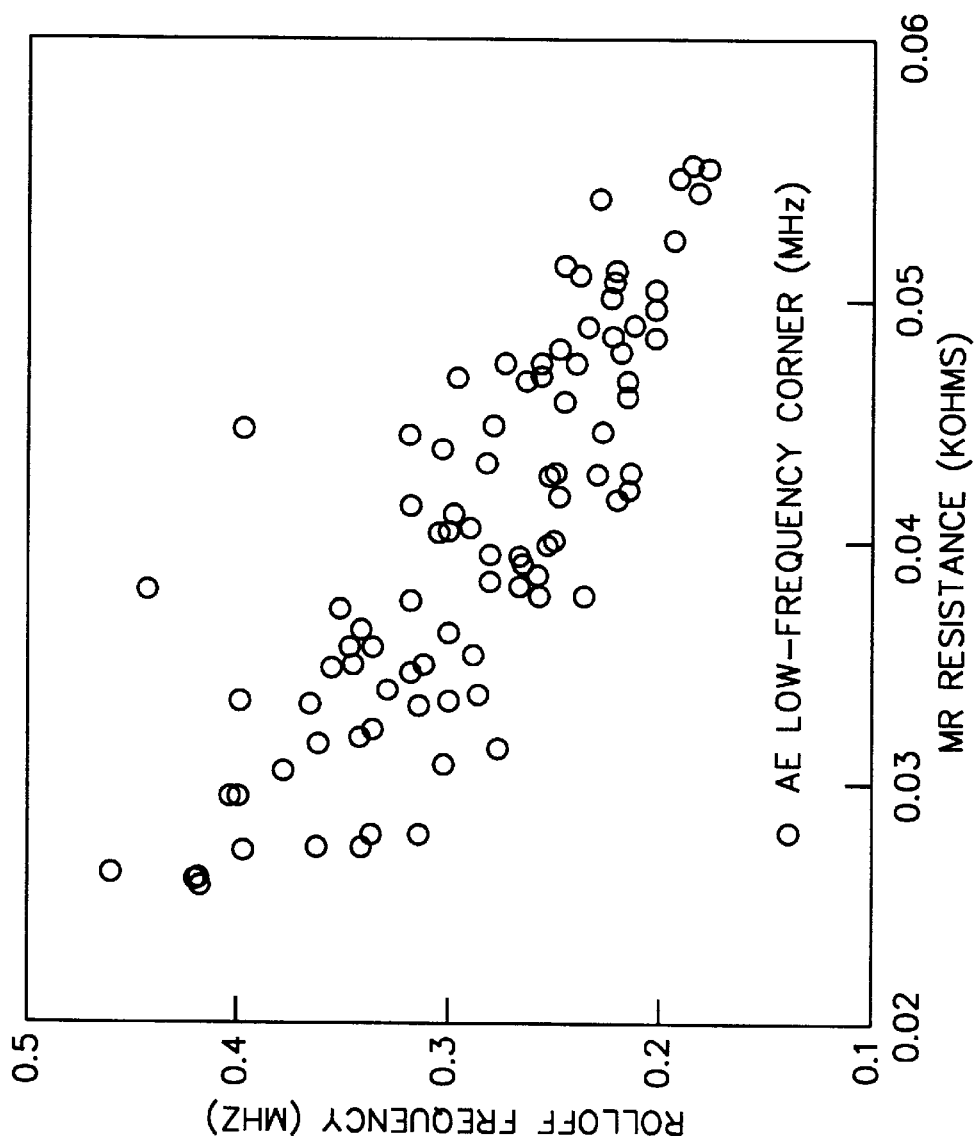

FIG. 9b is a plot of the AE corner frequency vs. MR head resistances (for a different batch of heads). The corner frequency depends approximately inversely with resistance.

Additional Tests:

Additional tests were conducted in connection with TPS calibration, the results of which are briefly discussed (but not depicted) here:

When the head is operating on the disk, both magnetic readback techniques and TPS are sensitive to topographical variations. The spectral response of the head for both techniques was obtained. The output of the magnetic readback circuitry comprised a rising spectral amplitude for the frequency range below 100 kHz, indicating the spectrum of disk roughness versus spatial wavelength. The TPS spectrum taken under the same conditions as the magnetic readback spectrum was measured. A very similar spectrum was observed, and in fact the ratio of the two data sets demonstrated that magnetic readback and TPS have the same frequency dependence in this band to within 1 dB. On the basis of these observations, since magnetic readback is known to be frequency independent, the response of TPS to topographic variations can be inferred as essentially flat with frequency over the range 1–100 kHz.

The response of the magnetoresistive sensor to a very slow square wave bias current, with an amplitude varying between 1.8 and 12 mA, and at a frequency ranging from a few Hertz to tens of kilohertz, was measured. (The lower current was used to provide a probe of resistance without additional self-heating. The bridge was balanced at the lower bias level.) Because a small perturbation is being sought against a large background, an accurate observation of the time response of the current-dependent resistance was not obtained. The MR sensor was included as one leg of a Wheatstone bridge, and only the current dependent part of the resistance was measured.

The recovery time using square wave excitation was measured. The head recovered thermally in roughly 10 microseconds, with a tail lasting roughly 50 microseconds. These measurements are consistent with previous measurements of harmonic generation, showing a gradual rolloff of thermal response with frequency over the range of roughly 20–300 kHz. Also taken were traces at lower test frequencies of 1 kHz, 50 kHz and 0.2 Hz. At the longest time, an additional resistance relaxation is observed, corresponding to a time constant of order a few seconds. This was interpreted to correspond to the low-frequency pole/zero associated with heat flow into the slider body. This relaxation is too slow to be observable or problematic for any of the frequency ranges of interest for TPS.

Additionally, the scaling of the relaxation voltage versus bias current level was measured. Bridge voltages for biases of 10 and 12.6 mA high bias, and 1.8 mA low bias, respectively were measured. Measurement frequency was 4 kHz. The voltage scale of the 12.6 mA relaxation was set to twice that of the 10 mA data. The cubic relationship was nearly perfectly met: i.e. $(12.6/10)^3$, demonstrating good agreement with the model of $C_3$ presented above.

3.0 Calibration by Induced Gap Variance

Another calibration technique, in accordance with the present invention, involves calibrating the sensor by physically changing the distance between the sensor and the medium surface, tracking the changes and monitoring the actual thermal response of the sensor. Motion in the sensor itself (and therefore a change in the distance) can be induced by various means, including piezoelectric excitation from a crystal mounted near the head, e.g., on the suspension arm, or by acoustic excitation, capacitive excitation, etc. The distance between the sensor and surface can also be changed by moving known topographical features on the surface past the head.

In the case where it is possible to closely monitor the movement of the head, a small vertical oscillation can be induced in the head by one of the techniques specified above. A separate system for monitoring the oscillation is employed. For example, the head motion can be measured optically using one of several possible schemes such as interferometry, triangulation, confocal, etc. A comparison of the thermal and optical signals then serves to calibrate the head thermally.

In the case where known topographical variations are moved past the sensor, a direct calibration results by comparing the height of these known features to the actual thermal response of the sensor.

However, in the case where the head is already installed in a data storage system, it is difficult to use a separate physical measurement to observe the head motion, or to use a medium having known variations. In this case, the head is oscillated an amount smaller than, but comparable to, the head-disk gap spacing. This can be accomplished using a mechanical shaker to excite head motion with respect to the disk.

3.1 Extraction of Sensitivity S from Head Movement

Using an assumption that the head temperature varies with gap spacing as 1/d, the head temperature is given by:

$$T = T_o + \frac{A}{d}$$

where:

$T_o$ is the operating temperature of the head; and

A is a head-dependent constant.

For a given bias current I, the TPS response signal $V_{TPS}$ (an exemplary measured actual thermal response or "atr") is given by:

$$V_{TPS} = I\left(R_o + \frac{\partial R}{\partial T}(T - T_o)\right)$$

or $$V_{TPS} = IR_o + I\frac{\partial R}{\partial T} \cdot \frac{A}{d}; \text{ where } \frac{\partial R}{\partial T} = \text{constant}$$

The sensitivity S (relating the change in voltage to the change in gap spacing) can therefore be derived as:

$$S = \frac{\partial V_{TPS}}{\partial d} = \frac{I_o \cdot \partial R}{\partial T} \cdot \frac{A}{d_o^2}$$

or, by introducing a calibration value $C_0$:

$$S = \frac{C_0}{d_o^2}; \text{ where } C_0 = I_o \frac{\partial R}{\partial T} A$$

where:

$d_o$ is the mean fly height (typically 50 nm).

The sensitivity S can be extracted by oscillating the head as it flies over the surface according to a movement function:

$$d = d_o + d_1 \sin(\omega t)$$

Typically, a head resonance frequency is chosen to obtain a larger excursion distance $d_1$ for a given excitation value. In one example, a head can be excited using a piezoceramic, using typical frequencies of 10–100 Khz. Using this movement function, the head voltage signal is given by:

$$V_{TPS} = \frac{I_o \partial R}{\partial T} \cdot \frac{A}{d_o + d_1 \sin(\omega t)} = \frac{C_0}{d_o + d_1 \sin \omega t}$$

It is noted that the head voltage is not simply sinusoidal. For $d << d_o$ the voltage is nearly sinusoidal, but as $d_1$ increases the voltage becomes more asymmetric. Upon excitation, the reciprocal of the actual thermal responses (i.e., 1/V) at corresponding times during the movement are plotted vs. $\sin(\omega t)$ to extract $C_0$ and $d_1$. Since $$\frac{1}{V_{TPS}} = \frac{d_o}{C_0} + \frac{d_1 \sin(\omega t)}{C_0}$$

the data can be plotted on a two-dimensional graph of the form y(1/V) vs. x ($\sin(\omega t)$), and as is well known, $$y = b + mx$$

where b is the y intercept; and
m is the slope.

The intercept and slope of this graph (along with the mean fly height $d_o$, known a-priori) yield $C_0$ and $d_1$:

$$C_0 = \frac{d_o}{b}$$

$$d_1 = C_0 m = \frac{d_o m}{b}$$

The sensitivity S can therefore also be obtained because:

$$S = \frac{C_0}{d_o^2} = \frac{1}{b d_o}$$

The sensitivity of the head is therefore determined by oscillating the head about a mean fly height using a movement function, in this example, a sinusoidal function. It should be noted that the excursion distance $d_1$ about the mean fly height need not be known, since the sensitivity merely depends on the mean fly height and the intercept point of the plot of the reciprocal of the actual thermal responses vs. the movement function $\sin(\omega t)$.

3.2 Test Results

Figure 11:
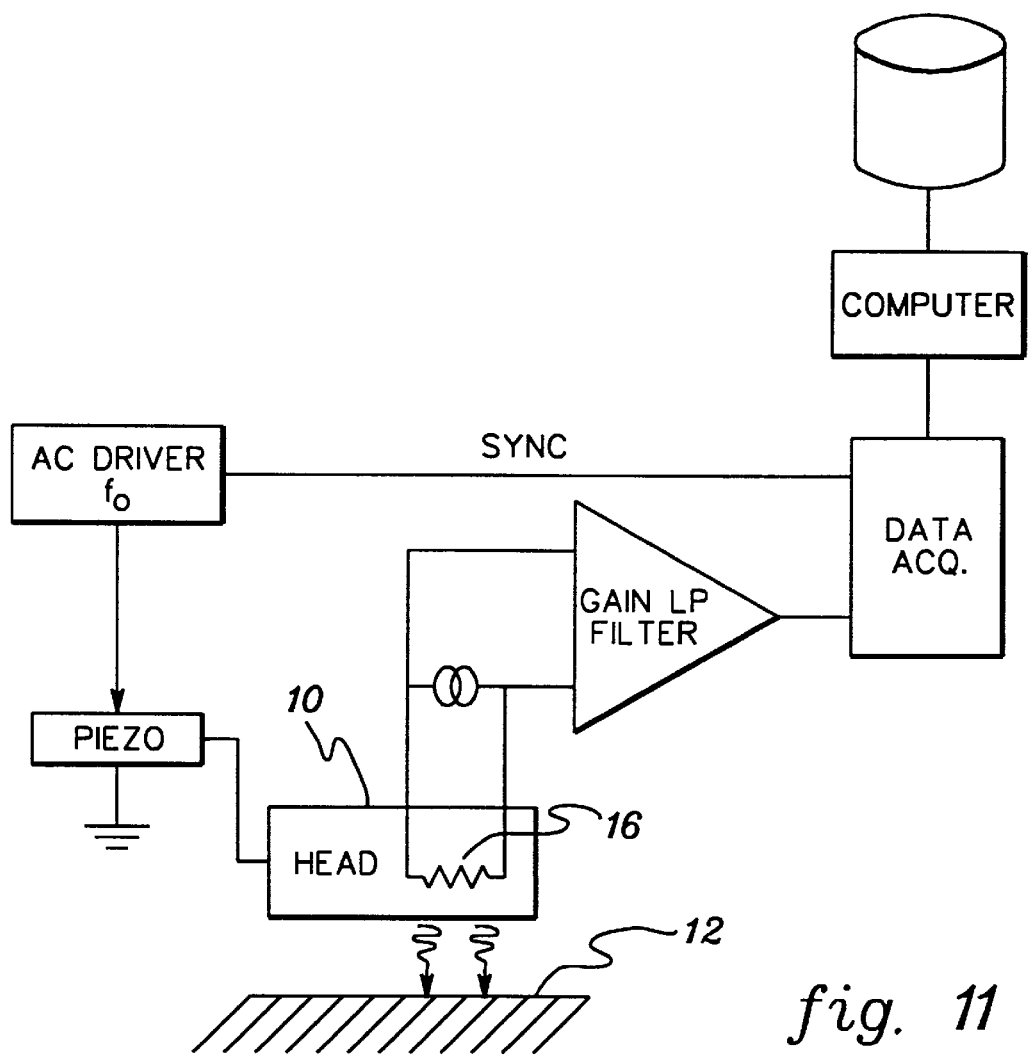
FIG. 11 depicts an exemplary piezo-based system wherein the sensor is mechanically excited while in motion above a disk.

FIG. 11 depicts an exemplary piezo-based system for calibrating a sensor wherein the sensor 16 is mechanically excited while in motion above the disk surface 12. The resultant actual thermal responses are collected using a data acquisition/processing system, and can thereafter be used to calibrate the sensor according to the techniques discussed herein. The processing system may perform any of the requisite calculations. It should be noted that all, or any subset of, the system components depicted in FIG. 11 may be located within the completed data storage system itself. Remaining components may be located outside of the system (e.g., in a dedicated calibration system).

Figure 12:
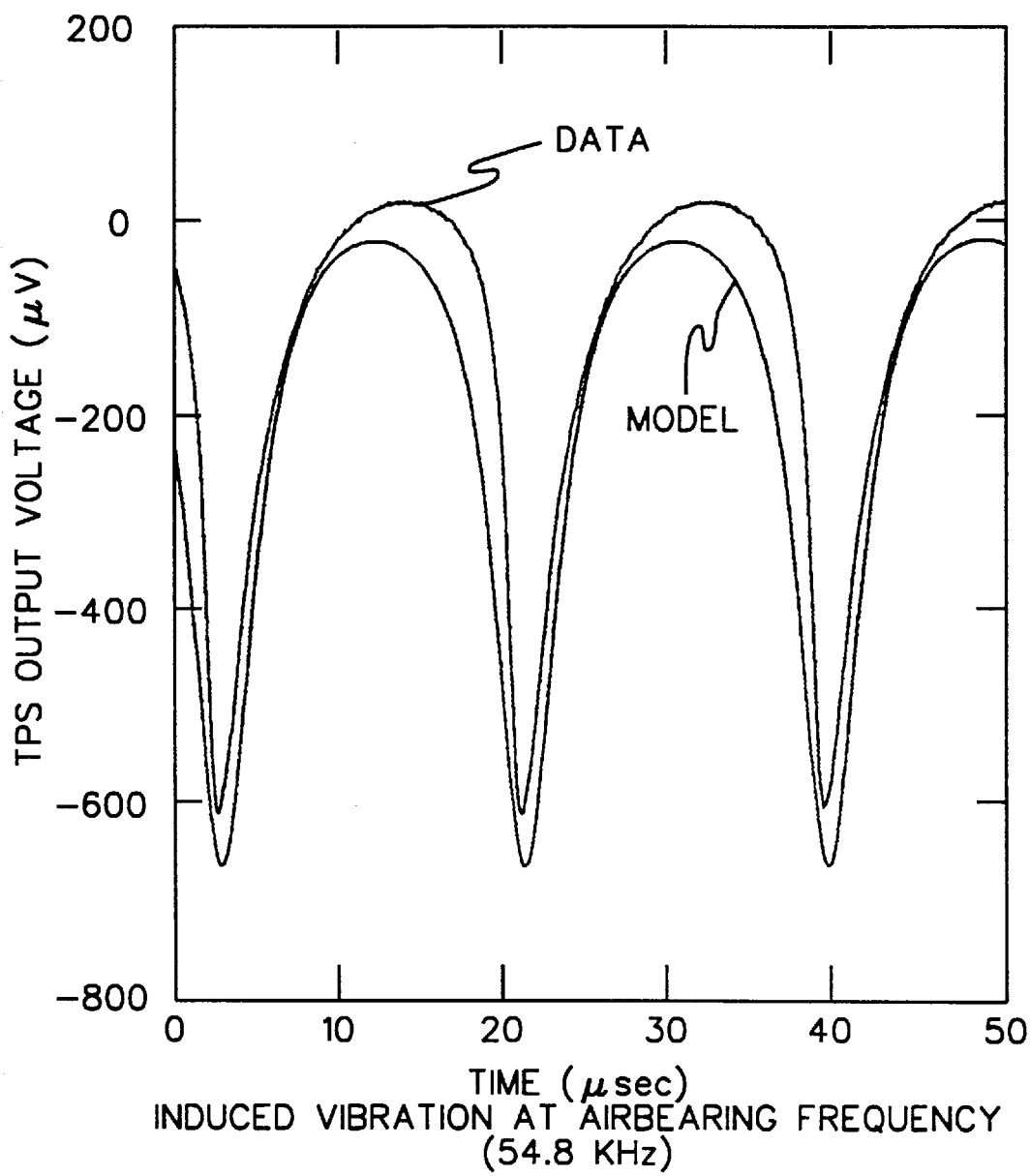
FIGS. 12–15 depict test results of two experiments wherein a head was sinusoidally excited to two different excursion distances about its mean fly height to obtain a calibration.
Figure 13:
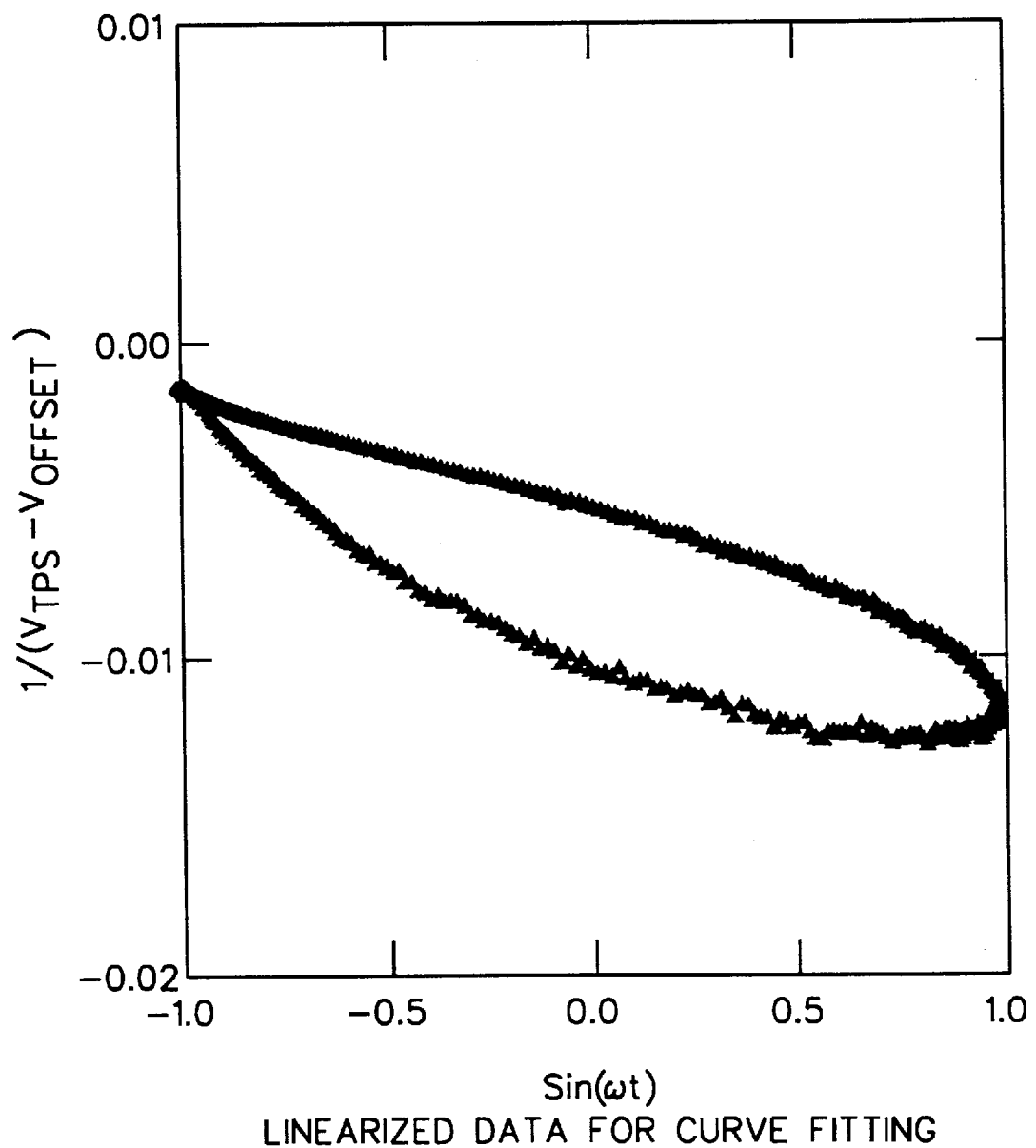
Figure 14:
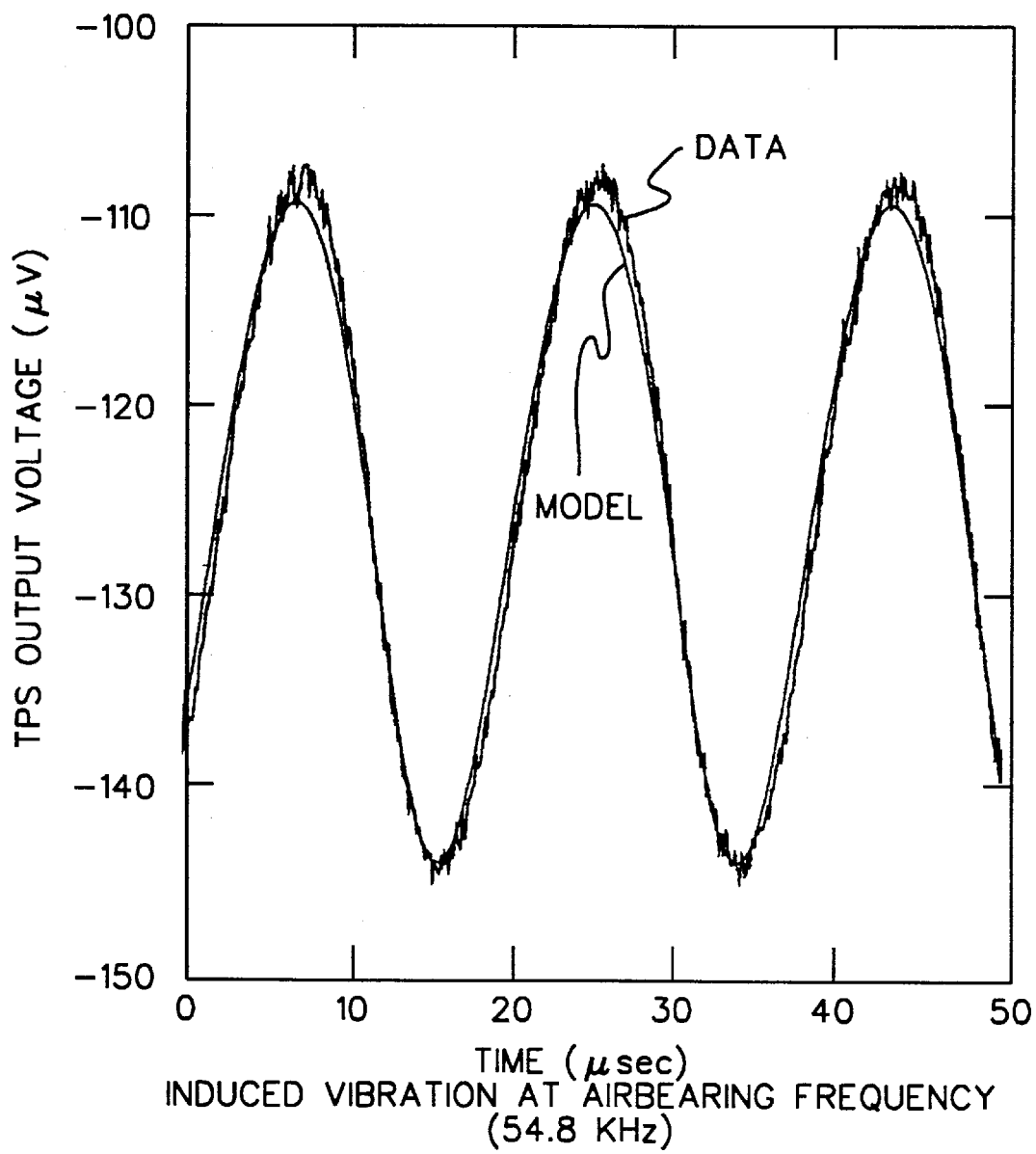
Figure 15:
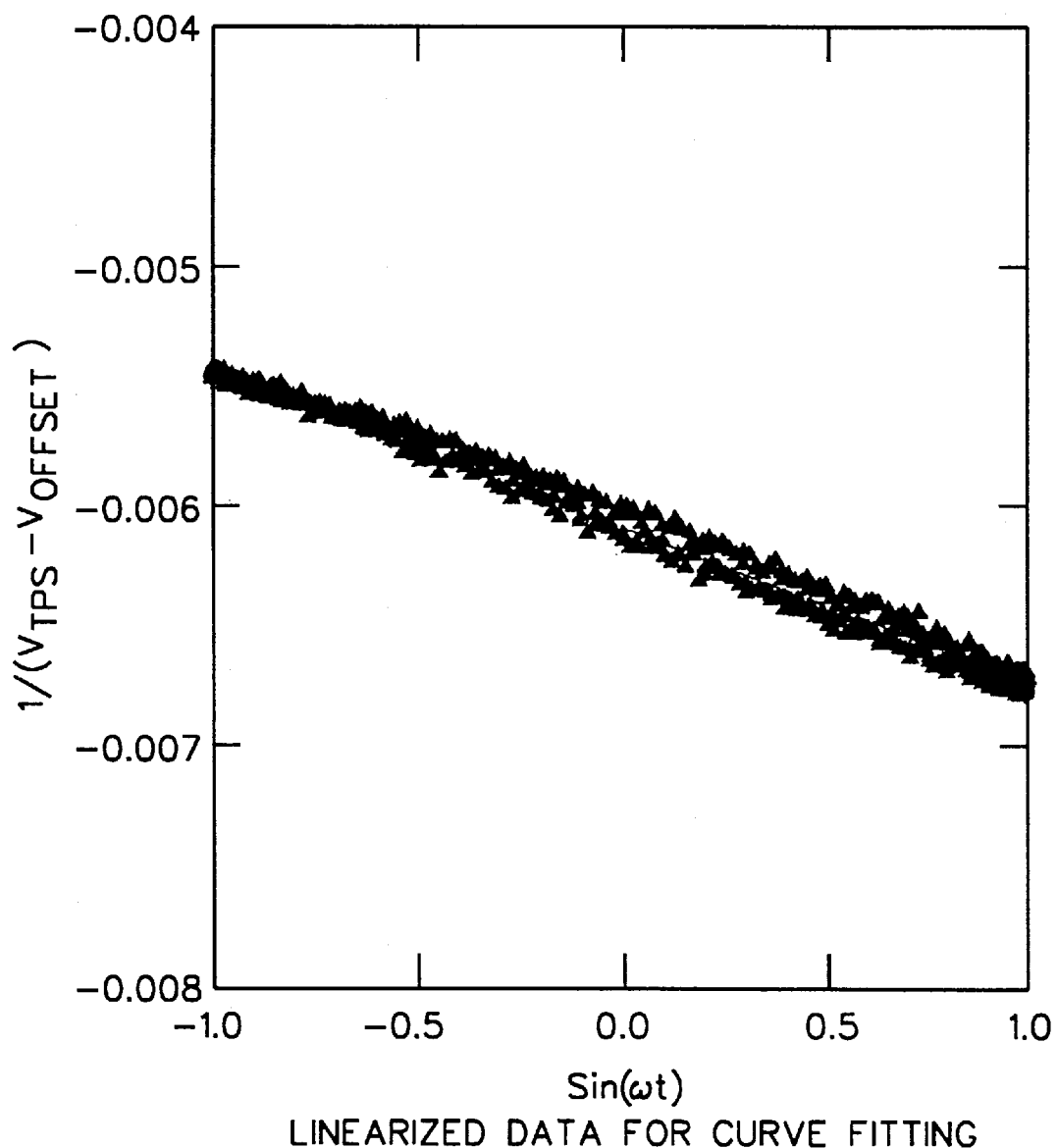

The thermal response may be non-linear with gap spacing, and therefore the sensor does not show a sinusoidal response but rather exhibits a varying degree of non-linear dependence as shown in FIGS. 12 and 14. By comparing the data to a model thermal response versus distance, the amplitude of vibration can be extracted as a fitting parameter. This is shown in both the model curves in FIGS. 12 and 14, and in the linearized plots shown in FIGS. 13 and 15. In FIGS. 13 and 15, the data is fit to a model in which the thermal output varies inversely with gap spacing, and it is additionally assumed that a sinusoidal variation in head height above the disk is induced. Verification of the calibration can be achieved by using the Wallace Spacing Law to establish the mean fly height of the head.

The data of FIGS. 12–15 was taken as the airbearing head was induced to oscillate at the resonant frequency, about 60 kHz, although there were several other frequencies nearby that could be used as well. For both tests the disk was run at about 12.9 m/s (4500 rpm at 27 mm radius). The bias current was at 8 mA. The output is from a head preamp, which has a gain of 1000. Typical variation are in the tens to hundreds of microvolts, corresponding to few parts per thousand resistance change. The vibration was induced with a piezo bimorph glued to the suspension. The resonant frequency was in the audio range and it was impractical to use it to vibrate above about 100 kHz.

The data was taken at two piezo drive levels, about 100 V p—p (FIGS. 12–13), and about 7 V p—p (FIGS. 14–15). The lower bias trace is sinusoidal as expected. The higher bias trace is more peaked as the head is forced towards the disk. The data was fit to the above-discussed model where the thermal signal depends as $1/d$, where d is the gap spacing. The frequency of the drive voltage is known, and measured values were obtained for the fly height.

A linear fit was obtained by plotting the actual thermal responses vs. the expected sinusoidal form. Within a few tens of percent, the calibration obtained in this manner is self-consistent. The hysteresis in the large excursion experiment is a result of the asymmetry clearly seen in the data plotted versus time.

The extraction of the calibration value $C_0$ and the excursion distance $d_1$ from the graph of FIG. 13 is shown here:

$$b = -.0075 = \frac{d_o(\text{nm})}{C_0} = \frac{95\text{nm}}{C_0}.$$

$$C_0 = 1.3 \times 10^4$$

$$m = 4.8 \times 10^{-3} = \frac{d_1}{C_0}$$

$$d_1 = 61\text{nm}$$

$$V_{TPS} = \frac{1.3 \times 10^4}{95\text{nm} + 61\text{nm } \sin(\omega t - \phi)} + 80 \, (mv)$$

The extraction of the calibration value $C_0$ and the excursion distance $d_1$ from the graph of FIG. 15 is shown here:

$$b = .006 = \frac{d_o(\text{nm})}{C_0} = \frac{95\text{nm}}{C_0}$$

$$C_0 = 1.6 \times 10^4$$

$$m = 6.25 \times 10^{-4} = \frac{d_1}{C_0}$$

$$d_1 = 9.6\text{nm}$$

$$V_{TPS} = \frac{1.6 \times 10^4}{95\text{nm} + 9.6\text{nm } \sin(\omega t - \phi)} - 40 \, (mv)$$

As discussed above, the sensitivity S can be determined from $C_0$ or and $d_o$ or b (intercept) directly as:

$$S = \frac{C_0}{d_o^2} = \frac{1}{b d_o}$$

These tests verify to some extent that (1) TPS is a direct measure of displacement, and not a derivative or something else unexplained, and (2) TPS allows measurement of gap spacing.

The non-linear dependence of TPS on gap spacing is expected to be a function of the distance between the sensor and the disk surface. As such, it establishes the spacing in an absolute sense, as opposed to a relative displacement such as that obtained with magnetic measurements. In the case of magnetic measurements, a takeoff curve is obtained in which the relative spacing of the head and disk is observed as a function of disk velocity. As the disk slows, the head drops with little flying attitude change. However, when the head hits the disk the plot of head displacement computed from the magnetic signal versus disk velocity changes direction, and the point of minimum displacement is interpreted as the point of contact. In the case of TPS, the signal change is non-linear, and therefore the surface can be anticipated without making contact, and in addition the zero-spacing condition is with reference to the sensor. This is therefore a physically different measurement than a magnetic measurement, where the measurement is intrinsically one of relative displacement.

As a caveat, care must be taken to perform the calibration on a region of the disk not exhibiting large anomalous topographic variations since the average TPS signal in that case would not follow a simple functional form reflecting a constant average head/disk spacing.

Figure 16:
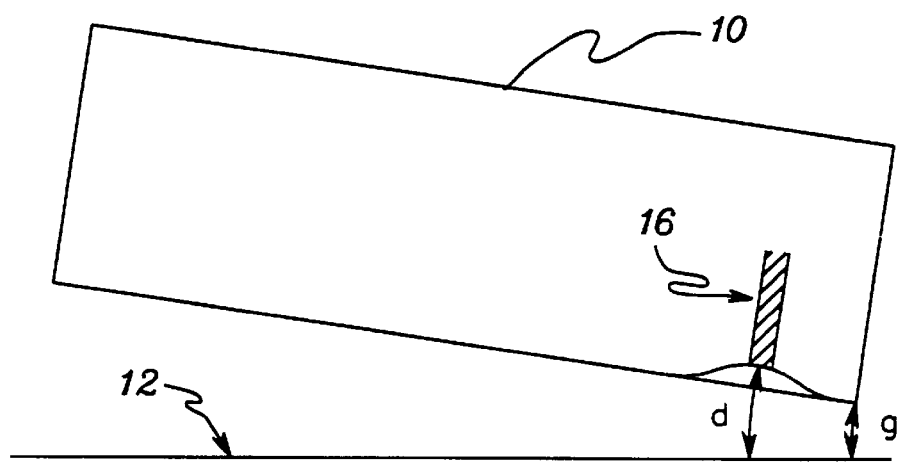
FIG. 16 depicts a particular type of measurement that can be made more accurately with thermal rather than magnetic proximity sensing techniques.

The calibration methods discussed herein are applicable to all applications of TPS, which include testing tools for assembled files, as well as defect sensors for individual disks. One specific area where it is anticipated that this method could be used is in making measurements of head recession. Here, the desired information is a measure of the difference between thermal ("d") and mechanical ("g") contact. (See FIG. 16). As discussed above, this corresponds to the difference in position between the magnetic and thermal 'zero' displacement.

While the invention has been particularly shown and described with reference to preferred embodiment(s) thereof, it will be understood by those skilled in the art that various changes in form and details may be made therein without departing from the spirit and scope of the invention.

What is claimed is:

1. A calibration method for determining a thermal sensitivity of a sensor to a distance between the sensor and a surface over which the sensor is moved, comprising:

varying an instantaneous distance d between the sensor and the surface relative to which the sensor is being moved;

measuring a plurality of actual thermal responses of the sensor at a plurality of actual times during said varying; and determining the thermal sensitivity of the sensor to the instantaneous distance d between the sensor and the surface using said plurality of actual thermal responses.

2. The method of claim 1, wherein said varying an instantaneous distance includes sinusoidally moving the sensor an excursion distance $d_1$ about a mean distance $d_o$ according to the movement function $$d = d_o + d_1 \sin(\omega t)$$

where $\omega$ comprises a frequency of movement, and t comprises time.

3. The method of claim 2, wherein said determining the thermal sensitivity includes determining a calibration value substantially according to the relationship:

$$atr(t) = \frac{C_0}{d_o + d_1 \sin(\omega t)}$$

where $C_0$ comprises the calibration value, and atr(t) comprises an actual thermal response at time t.

4. The method of claim 3, wherein said determining a calibration value includes determining an intercept point of a curve linearly fitted to a plurality of data points each comprising a first value and a second value, the first value being related to the reciprocal of one actual thermal response of the plurality of actual thermal responses and the second value being related to sin ($\omega t'$) at the respective time t' of the plurality of respective times.

5. The method of claim 4, wherein the calibration value $C_0$ is proportional to the mean distance $d_o$ multiplied by the reciprocal of the intercept point, the calibration value therefore being determined independent of the excursion distance $d_1$.

6. The method of claim 5, wherein said determining a thermal sensitivity includes determining a sensitivity value, wherein the thermal sensitivity of the sensor value relates to the instantaneous distance d according to the sensitivity value, the sensitivity value being proportional to the calibration value multiplied by the reciprocal of the square of the mean distance $d_o$.

7. The method of claim 6, wherein the sensor comprises an access element and the surface comprises a storage medium to be accessed by the access element.

8. The method of claim 1, wherein the sensor comprises an access element and the surface comprises a storage medium to be accessed by the access element.

9. The method of claim 2, wherein said determining a thermal sensitivity includes determining an intercept point of a curve linearly fitted to a plurality of data points each comprising a first value and a second value, the first value being related to the reciprocal of one actual thermal response of the plurality of actual thermal responses and the second value being related to sin ($\omega t'$) at the respective time t' of the plurality of respective times.

10. The method of claim 9, wherein said determining a thermal sensitivity includes determining a sensitivity value, wherein the thermal sensitivity of the sensor relates to the instantaneous distance d according to the sensitivity value, the sensitivity value being proportional to the reciprocal of the intercept point multiplied by the reciprocal of the mean distance $d_o$.

11. The method of claim 10, wherein the sensor comprises an access element and the surface comprises a storage medium to be accessed by the access element.

12. A method for thermally measuring the height of topographical variations on a storage mediun, comprising:

determining a thermal sensitivity of a sensor to an instantaneous distance between the sensor and a surface relative to which the sensor is to be moved, according to the calibration method of claim 1, wherein the storage medium comprises the surface;

thereafter moving the sensor relative to the storage medium at a substantially constant distance therefrom; and using said thermal sensitivity to measure the instantaneous distance between the sensor and the storage medium and therefore the height of the topographical variations on the storage medium.

13. The method of claim 1, wherein:

said varying an instantaneous distance d includes moving the sensor according to a movement function; and said determining a thermal sensitivity includes determining a difference between a plurality of model thermal responses corresponding to said movement function and said plurality of actual thermal responses.

14. The method of claim 13, wherein the difference is a non-linear function relating the instantaneous distance d to the plurality of actual thermal responses.

15. The method of claim 1, further comprising:

monitoring a position of the sensor as the instantaneous distance d between the sensor and the surface is varied, including producing a monitored position function; and wherein said determining includes comparing said plurality of actual thermal responses to said monitored position function.

16. The method of claim 15, wherein the sensor comprises an access element and the surface comprises a storage medium to be accessed by the access element.

17. The method of claim 1, wherein said varying an instantaneous distance d between the sensor and the surface includes placing the sensor in motion relative to the surface, the surface having topographical variations of a predetermined nature thereon, the instantaneous distance being varied as the topographical variations move past the sensor.

18. A calibration system for determining a thermal sensitivity of a sensor to a distance between the sensor and a surface over which the sensor is moved, comprising:

means for varying an instantaneous distance d between the sensor and the surface relative to which the sensor is being moved;

a circuit for measuring a plurality of actual thermal responses of the sensor at a plurality of actual times during said varying; and means for determining the thermal sensitivity of the sensor to the instantaneous distance d between the sensor and the surface using said plurality of actual thermal responses.

19. The system of claim 18, wherein said means for varying an instantaneous distance includes means for sinusoidally moving the sensor an excursion distance $d_1$ about a mean distance $d_o$ according to the movement function $$d = d_o + d_1 \sin(\omega t)$$

where $\omega$ comprises a frequency of movement, and t comprises time.

20. The system of claim 19, wherein said means for determining the thermal sensitivity includes means for determining a calibration value substantially according to the relationship:

$$atr(t) = \frac{C_0}{d_o + d_1 \sin(\omega t)}$$

where $C_0$ comprises the calibration value, and atr(t) comprises an actual thermal response at time t.

21. The system of claim 20, wherein said means for determining a calibration value includes means for determining an intercept point of a curve linearly fitted to a plurality of data points each comprising a first value and a second value, the first value being related to the reciprocal of one actual thermal response of the plurality of actual thermal responses and the second value being related to sin ($\omega t'$) at the respective time t' of the plurality of respective times.

22. The system of claim 21, wherein the calibration value $C_0$ is proportional to the mean distance $d_o$ multiplied by the reciprocal of the intercept point, the calibration value therefore being determined independent of the excursion distance $d_1$.

23. The system of claim 22, wherein said means for determining a thermal sensitivity includes means for determining a sensitivity value, wherein the thermal sensitivity of the sensor value relates to the instantaneous distance d according to the sensitivity value, the sensitivity value being proportional to the calibration value multiplied by the reciprocal of the square of the mean distance $d_o$.

24. The system of claim 23, wherein the sensor comprises an access element and the surface comprises a storage medium to be accessed by the access element.

25. The system of claim 18, wherein the sensor comprises an access element and the surface comprises a storage medium to be accessed by the access element.

26. The system of claim 19, wherein said means for determining a thermal sensitivity includes means for determining an intercept point of a curve linearly fitted to a plurality of data points each comprising a first value and a second value, the first value being related to the reciprocal of one actual thermal response of the plurality of actual thermal responses and the second value being related to sin ($\omega t'$) at the respective time t' of the plurality of respective times.

27. The system of claim 26, wherein said means for determining a thermal sensitivity includes means for determining a sensitivity value, wherein the thermal sensitivity of the sensor relates to the instantaneous distance d according to the sensitivity value, the sensitivity value being proportional to the reciprocal of the intercept point multiplied by the reciprocal of the mean distance $d_o$.

28. The system of claim 27, wherein the sensor comprises an access element and the surface comprises a storage medium to be accessed by the access element.

29. A system for thermally measuring the height of topographical variations on a storage medium, comprising:

means for determining a thermal sensitivity of a sensor to an instantaneous distance between the sensor and a surface relative to which the sensor is to be moved, including the calibration system of claim 18, wherein the storage medium comprises the surface;

means for moving the sensor relative to the storage medium at a substantially constant distance therefrom; and means for using said thermal sensitivity to measure the instantaneous distance between the sensor and the storage medium and therefore the height of the topographical variations on the storage medium.

30. The system of claim 18, wherein:

said means for varying an instantaneous distance d includes means for moving the sensor according to a movement function; and said means for determining a thermal sensitivity includes means for determining a difference between a plurality of model thermal responses corresponding to said movement function and said plurality of actual thermal responses.

31. The system of claim 30, wherein the difference is a non-linear function relating the instantaneous distance d to the plurality of actual thermal responses.

32. The system of claim 18, further comprising:

means for monitoring a position of the sensor as the instantaneous distance d between the sensor and the surface is varied, including means for producing a monitored position function; and wherein said means for determining includes means for comparing said plurality of actual thermal responses to said monitored position function.

33. The system of claim 32, wherein the sensor comprises an access element and the surface comprises a storage medium to be accessed by the access element.

34. The system of claim 18, wherein said means for varying an instantaneous distance d between the sensor and the surface includes topographical variations of a predetermined nature on said surface, the instantaneous distance being varied as the topographical variations move past the sensor.

* * * * *

UNITED STATES PATENT AND TRADEMARK OFFICE
CERTIFICATE OF CORRECTION

PATENT NO. 6,004,030

DATED  Dec. 21, 1999

INVENTOR(S)  Abraham et al.

It is certified that error appears in the above-identified patent and that said Letters Patent is hereby corrected as shown below:

Column 9, lines 28-38 delete the present equation and replace with:

--Solving this system of equation for $C_3$:

$$\begin{bmatrix} C_1 \\ C_3 \end{bmatrix} = \begin{bmatrix} I_1 & I_1^3 \\ I_2 & I_2^3 \end{bmatrix}^{-1} \begin{bmatrix} V_1 \\ V_2 \end{bmatrix}$$

$$\begin{bmatrix} C_1 \\ C_3 \end{bmatrix} = \begin{bmatrix} I_2^3 & -I_1^3 \\ -I_2 & I_1 \end{bmatrix} \cdot \frac{1}{I_1 I_2^3 - I_2 I_1^3} \cdot \begin{bmatrix} V_1 \\ V_2 \end{bmatrix}$$

$$C_3 = \frac{-V_1 I_2 + V_2 I_1}{I_1 I_2^3 - I_2 I_1^3}$$

Signed and Sealed this

Twelfth Day of September, 2000

Attest:

Q. TODD DICKINSON

*Attesting Officer*    *Director of Patents and Trademarks*